(12) United States Patent
Damnjanovic et al.

(10) Patent No.: US 8,868,091 B2
(45) Date of Patent: Oct. 21, 2014

(54) METHODS AND APPARATUS FOR FACILITATING INTER-CELL INTERFERENCE COORDINATION VIA OVER THE AIR LOAD INDICATOR AND RELATIVE NARROWBAND TRANSMIT POWER

(75) Inventors: Aleksandar Damnjanovic, Del Mar, CA (US); Yongbin Wei, San Diego, CA (US); Madhavan Srinivasan Vajapeyam, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 13/007,955

(22) Filed: Jan. 17, 2011

(65) Prior Publication Data
US 2012/0021753 A1    Jan. 26, 2012

Related U.S. Application Data

(60) Provisional application No. 61/295,828, filed on Jan. 18, 2010.

(51) Int. Cl.
*H04W 72/00* (2009.01)
*H04W 72/12* (2009.01)
*H04W 72/08* (2009.01)
*H04W 16/10* (2009.01)

(52) U.S. Cl.
CPC ........ *H04W 72/082* (2013.01); *H04W 72/1289* (2013.01); *H04W 16/10* (2013.01); *H04W 72/1231* (2013.01)
USPC ........ 455/452.1; 455/450; 455/453; 455/63.1

(58) Field of Classification Search
USPC ........... 455/10, 13.3, 504, 63.1, 67.13, 67.14, 455/69, 522, 277.2, 132, 134, 562.1, 452.1, 455/453; 370/241, 252, 329, 330
See application file for complete search history.

(56) References Cited

U.S. PATENT DOCUMENTS 6,101,179 A    8/2000  Soliman
6,574,461 B1 *  6/2003  Skold ......................... 455/277.2

(Continued)

FOREIGN PATENT DOCUMENTS

CN    1992564 A    7/2007
JP    H11285062 A  10/1999

(Continued)

OTHER PUBLICATIONS

3GPP TS 25.211 V6.10.0 (Sep. 2009) : 3rd Generation Partnership Project; Technical Specification Group Radio Access Network; Physical channels and mapping of transport channels onto physical channels (FDD) (Release 6), pp. 1-51.

(Continued)

*Primary Examiner* — Jean Gelin
(74) *Attorney, Agent, or Firm* — Nerrie M. Zohn

(57) ABSTRACT

Systems and methods for facilitating inter-cell interference coordination using resource partitioning are described. A UE may receive or determine information related to received interference and/or future scheduling. The information may be communicated to a serving base station, which may use the information to allocate uplink or downlink resources between cells. The uplink and/or downlink resource may be partitioned in subbands to mitigate interference from adjacent network nodes. The eNBs may communicate, such as directly, via a backhaul connection, and/or between UEs to configure interference coordination and signaling.

51 Claims, 25 Drawing Sheets

(56) References Cited

U.S. PATENT DOCUMENTS

| | | | |
|---|---|---|---|
| 8,228,853 B2 * | 7/2012 | Ji et al. | 370/329 |
| 8,270,362 B2 * | 9/2012 | Uemura et al. | 370/329 |
| 8,285,216 B2 | 10/2012 | Malladi et al. | |
| 2002/0114309 A1 * | 8/2002 | Chow et al. | 370/347 |
| 2004/0156328 A1 | 8/2004 | Walton et al. | |
| 2006/0034240 A1 | 2/2006 | Kwak et al. | |
| 2006/0203753 A1 | 9/2006 | Toskala et al. | |
| 2007/0004423 A1 | 1/2007 | Gerlach et al. | |
| 2007/0064669 A1 | 3/2007 | Classon et al. | |
| 2007/0115878 A1 | 5/2007 | Ashish et al. | |
| 2008/0005219 A1 * | 1/2008 | Nabar et al. | 709/201 |
| 2008/0081564 A1 | 4/2008 | Rao | |
| 2008/0081655 A1 | 4/2008 | Shin et al. | |
| 2008/0220806 A1 | 9/2008 | Shin et al. | |
| 2009/0016223 A1 * | 1/2009 | Kim et al. | 370/236.1 |
| 2009/0075596 A1 * | 3/2009 | Gorokhov et al. | 455/62 |
| 2009/0088083 A1 | 4/2009 | Fujii et al. | |
| 2009/0197631 A1 * | 8/2009 | Palanki et al. | 455/522 |
| 2010/0029320 A1 | 2/2010 | Malladi et al. | |
| 2010/0075689 A1 | 3/2010 | Uemura et al. | |
| 2010/0208687 A1 * | 8/2010 | Lim et al. | 370/329 |
| 2010/0220808 A1 | 9/2010 | Kishigami et al. | |
| 2010/0273502 A1 * | 10/2010 | Uemura et al. | 455/452.2 |
| 2011/0003598 A1 * | 1/2011 | Ma et al. | 455/452.1 |
| 2011/0022714 A1 | 1/2011 | Nobukiyo | |
| 2011/0038271 A1 | 2/2011 | Shin et al. | |
| 2011/0171955 A1 * | 7/2011 | Acharya | 455/434 |
| 2011/0194483 A1 * | 8/2011 | Ji et al. | 370/315 |
| 2011/0222416 A1 | 9/2011 | Damnjanovic et al. | |
| 2011/0223929 A1 * | 9/2011 | Boudreau et al. | 455/452.1 |
| 2011/0273997 A1 | 11/2011 | Sumasu et al. | |
| 2012/0082120 A1 * | 4/2012 | Chun et al. | 370/329 |
| 2013/0077586 A1 | 3/2013 | Damnjanovic et al. | |
| 2013/0223373 A1 | 8/2013 | Damnjanovic et al. | |
| 2013/0244678 A1 | 9/2013 | Damnjanovic et al. | |
| 2013/0281107 A1 * | 10/2013 | Uemura et al. | 455/452.1 |

FOREIGN PATENT DOCUMENTS

| | | |
|---|---|---|
| JP | 2006352860 A | 12/2006 |
| JP | 2009010991 A | 1/2009 |
| JP | 2009100452 A | 5/2009 |
| JP | 2009296662 A | 12/2009 |
| JP | 2010506488 A | 2/2010 |
| KR | 20090083449 A | 8/2009 |
| WO | WO-2008041893 A1 | 4/2008 |
| WO | WO2008042187 A2 | 4/2008 |
| WO | WO2008055132 A2 | 5/2008 |
| WO | 2008069105 A1 | 6/2008 |
| WO | WO2008109162 A2 | 9/2008 |
| WO | WO2009022473 A1 | 2/2009 |
| WO | WO-2009088999 A1 | 7/2009 |
| WO | WO-2009122776 A1 | 10/2009 |

OTHER PUBLICATIONS

3GPP TS 25.212 V6.10.0 (Dec. 2006) : 3rd Generation Partnership Project; Technical Specification Group Radio Access Network; Multiplexing and channel coding (FDD) (Release 6), pp. 1-84.

3GPP TS 25.213 V6.5.0 (Mar. 2006) : 3rd Generation Partnership Project; Technical Specification Group Radio Access Network; Spreading and modulation (FDD) (Release 6), pp. 1-32.

TIA/EIA Interim Standard: CDMA2000 High Rate Packet Data Air Interface Specification, TIA/EIA/IS-856, Nov. 2000, pp. 1-450.

CMCC: "Summary of HeNB interference management methods based on different interference scenarios", 3GPP Draft; R4-093611, 3rd Generation Partnership Project (3GPP), Mobile Competence Centre ; 650, Route Des Lucioles ; F-06921 Sophia-Antipolis Cedex ; France, no. Miyazaki; 20091012, Oct. 12, 2009, XP050393223, [retrieved on Oct. 6, 2009].

International Search Report and Written Opinion—PCT/US2011/021569—ISA/EPO—Jun. 1, 2011.

Lucent Technologies: "Uplink Scheduling With Inter-cell Interference Control" 36PP Draft; R2-062814, SRD Generation Partnership Project (3GPP), Mobile Competence Centre ; 650, Route Des Lucioles ; F-06921 Sophia-Antipolis Cedex ; France, vol . RAN WG2, no. Seoul, Korea; 20061005, Oct. 5, 2006, XP050132339.

Nokia Siemens Networks et al: "Way Forward on Relative Narrowband TX Power Indicator for DL ICIC", 3GPP Draft; R1-082179, 3rd Generation Partnership Project (3GPP), Mobile Competence Centre ; 650, Route Des Lucioles ; F-06921 Sophia-Antipolis Cedex ; France, vol. RAN WG3, no. Jeju Island; 20080801, Aug. 1, 2008, XP050164782, [retrieved on Aug. 1, 2008].

Nokia Siemens Networks: "Uplink and Downlink ICIC Indication", 3GPP Draft; R3-080398, 3rd Generation Partnership Project (3GPP), Mobile Competence Centre ; 650, Route Des Lucioles ; F-06921 Sophia-Antipolis Cedex ; France, vol. RAN WG3, no. Sorrento, Italy; 20080206, Feb. 6, 2008, XP050163602, [retrieved on Feb. 6, 2008].

Qualcomm Europe, "UL Interference Control in the Absence of X2 for Rel 9", 3GPP Draft, R1-091442 ICIC With No X2, 3rd Generation Partnership Project (3GPP), Mobile Competence Centre, 650, Route Des Lucioles, F-06921 Sophia-Antipolis Cedex, France, no. Seoul, Korea, 20090318, Mar. 18, 2009, XP050339016.

Samsung, "Multi-user MIMO enhancement in LTE-A", 3GPP Draft, RI-092680 MU-MIMO, 3rd Generation Partnership Project (3GPP), Mobile Competence Centre , 650, Route Des Lucioles , F-06921 Sophia-Antipolis Cedex , France, no. Los Angeles, USA, 20090624, Jun. 24, 2009, XP050351160.

3rd Generation Partnership Project; Technical Specification Group Radio Access Network; Evolved Universal Terrestrial Radio Access (E-UTRA) Radio Resource Control (RRC); Protocol specification (Release 9), 3GPP Standard; 3GPP TS 36.331, 3rd Generation Partnership Project (3GPP), Mobile Competence Centre ; 650, Route Des Lucioles ; F-06921 Sophia-Antipolis Cedex ; France, No. V9.1.0, Jan. 7, 2010, pp. 1-221, XP050401822, [retrieved on Jan. 7, 2010].

3rd Generation Partnership Project; Technical Specification Group Radio Access Network; Evolved Universal Terrestrial Radio Access Network (E-UTRAN); X2 application protocol (X2AP) (Release 9), 3GPP Standard; 3GPP TS 36.423, 3rd Generation Partnership Project (3GPP), Mobile Competence Center; 650, Route Des Lucioles; F-06921 Sophia-Antipolis Cedex; France, No. V9.1.0, Dec. 18, 2009, pp. 1-114, XP050401360, [retrived on Dec. 18, 2009].

European Search Report—EP13161464—Search Authority—Berlin—May 7, 2013.

* cited by examiner

METHODS AND APPARATUS FOR FACILITATING INTER-CELL INTERFERENCE COORDINATION VIA OVER THE AIR LOAD INDICATOR AND RELATIVE NARROWBAND TRANSMIT POWER

CROSS-REFERENCE TO RELATED APPLICATIONS

This application claims priority under 35 U.S.C. §119(e) to U.S. Provisional Patent Application Ser. No. 61/295,828, entitled METHOD AND APPARATUS FOR FACILITATING INTER-CELL INTERFERENCE COORDINATION VIA OVER THE AIR LOAD INDICATOR AND RELATIVE NARROWBAND TRANSMIT POWER, filed on Jan. 18, 2010, the content of which is hereby incorporated by reference herein in its entirety for all purposes.

FIELD

This application is directed generally to wireless communications systems. More particularly, but not exclusively, the application relates to methods, apparatus and systems for providing over the air (OTA) load indication information and Relative Narrowband Transmit Power (RNTP) information to facilitate inter-cell interference coordination (ICIC) and associated scheduling in wireless communication systems such as LTE systems.

BACKGROUND

Wireless communication systems are widely deployed to provide various types of communication content such as voice, data, video and the like, and deployments are likely to increase with introduction of new data oriented systems such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and other orthogonal frequency division multiple access (OFDMA) systems.

Generally, a wireless multiple-access communication system can simultaneously support communication for multiple wireless terminals (also know as user equipments (UEs), or access terminals (ATs). Each terminal communicates with one or more base stations (also know as access points (APs), eNodeBs or eNBs) via transmissions on forward and uplinks. The forward link (also referred to as a downlink or DL) refers to the communication link from the base stations to the terminals, and the uplink (also referred to as a reverse link or UL) refers to the communication link from the terminals to the base stations.

Base station nodes, also referred to as enhanced Node Bs or eNBs, have different capabilities for deployment in a network. This includes transmission power classes, access restriction, and so forth. In one aspect, heterogeneous network characteristics may create wireless coverage dead spots (e.g., Donut coverage hole). This may cause severe inter-cell interference requiring undesirable user equipment cell association. In general, heterogeneous network characteristics require deep penetration of physical channels, which may cause unwanted interference between nodes and equipment on the respective network.

As the number of mobile stations deployed increases, the need for proper bandwidth utilization becomes more important. Moreover, with the introduction of semiautonomous base stations for managing small cells, such as femtocells, in systems such as LTE, interference with existing base stations may become an increasing problem.

SUMMARY

Various aspects of this disclosure, as performed by access terminals (ATs) or user equipments (UEs) in wireless communication systems, such as LTE systems, relate to interference and path loss determinations for surrounding transmitters that may be in adjacent or neighboring cells. These determinations may be employed in identifying network base stations, performing handoff determinations, managing interference between network cells, or other inter-network or ICIC functions. Depending on various conditions (e.g., current network load, prevailing wireless conditions, channel quality, path loss on one or more wireless links, etc.), it may be desirable to schedule UE transmissions on particular resources and/or at particular transmit powers in a manner that mitigates interference to neighboring cells and associated base stations.

In order to control scheduling, it may be desirable to provide over the air (OTA) load indication signaling to UEs and/or other wireless nodes in adjacent or neighboring cells. The UEs may use this information, and/or additional information, to determine a transmit power metric, which may be reported to a serving base station, such as an eNB. In addition, it may be desirable to minimize interference over thermal noise (IoT), and maximize data throughput for wireless communications in various aspects.

This disclosure is directed generally to inter-cell interference coordination (ICIC) in a wireless communication system using Load Indication (LI) information and/or Relative Narrowband Transmit Power (RNTP) information for facilitating resource partitioning.

For example, in one aspect the disclosure relates to a method for interference mitigation in a wireless communication system. The method may include, for example, determining interference information applicable to at least one of a serving cell and a neighbor cell. The method may further include scheduling signal transmission within the serving cell based at least in part upon the interference information.

The interference information may include, for example, an interference value corresponding to an amount of uplink interference experienced at a serving base station in the serving cell. The method may further include comparing the interference value to a target value, and communicating, based upon the comparing, at least one load indicator (LI) signal to one or more devices in the neighboring cell. The at least one load indicator signal may be communicated to the neighboring cell using over the air (OTA) signaling.

The method may further include, for example, receiving a transmit power metric from a served UE. The scheduling may further include generating, based at least in part on the transmit power metric, an uplink scheduling assignment for the served UE. The method may further include communicating a resource partitioning request to one or more nodes in the neighboring cell. The method may further include receiving a resource partitioning response. The resource partitioning request may relate to uplink subband partitioning between the serving cell and the neighboring cell.

The scheduling may be based, for example, upon a partitioning of uplink communication resources between the serving cell and the neighbor cell. The partitioning may be predetermined and communicated to the serving cell and the neighbor cell. Alternately or in addition, the partitioning may be dynamically determined based on information provided from a served user terminal in the serving cell. Alternately, or in addition, the partitioning may be negotiated between the serving cell and the neighbor cell.

The interference information may relate, for example, to resources to be used in transmission of one or more downlink signals from the neighbor cell. The interference information may relate to an expected amount of downlink interference experienced at a user terminal served in the serving cell. The interference information may relate, for example, to relative narrowband transmit power (RNTP) information associated with future transmissions in one or more subbands of the neighbor cell, power per antenna information associated with future transmissions in one or more subbands of the neighbor cell, phase or phase offset per antenna information associated with future transmissions in one or more subbands of the neighbor cell, and/or other information related to future transmissions from a neighbor cell. The interference information may be sent from the neighboring cell using Over the Air (OTA) signaling.

The method may further include, for example, receiving adjusted Channel State Information (CSI) from a served UE. The scheduling may include generating, based at least in part on the Adjusted CSI, a downlink schedule for the serving base station. The downlink schedule may be based on a subband resource partition between the serving cell and the neighbor cell.

The method may further include, for example, communicating a resource partitioning request to one or more nodes in the neighboring cell. The method may further include receiving a resource partitioning response. The resource partitioning request may relate to a proposed downlink subband partitioning between the serving cell and the neighboring cell.

The scheduling may be based, for example, in part upon a negotiated partitioning of downlink communication resources between the serving cell and the neighboring cell. The partitioning may be predetermined and communicated to the serving cell and the neighbor cell. Alternately or in addition, the partitioning is predetermined and communicated to the serving cell and the neighbor cell. Alternately or in addition, the partitioning may be dynamically determined based on information provided from a served user terminal in the serving cell. Alternately or in addition, the partitioning may be negotiated between the serving cell and the neighbor cell.

In another aspect, the disclosure relates to a method for interference mitigation in a wireless communication system. The method may include, for example, determining Future Scheduling Information (FSI) including data defining planned future use of one or more downlink subband resources. The method may further include sending the FSI. The method may further include sending control signaling. The control signaling may be done at a fixed offset relative to a Common Reference Signal (CRS).

The FSI may include, for example, RNTP information. The RNTP Information may be an RNTP bitmap. The control signaling may include one or more of PDCCH, PHICH, and PCFCH. The control signaling may be Physical Downlink Control Channel (PDCCH) signaling. The fixed offset may include a predetermined fixed power offset relative to the CRS. The fixed offset is predefined. Alternately or in addition, the fixed offset may be dynamically determined.

In another aspect, the disclosure relates to a method for facilitating interference mitigation in a multi-cell environment. The method may include, for example, receiving interference information. The method may further include determining a parameter based at least in part upon the interference information, and transmitting the parameter to a serving network node of a serving cell.

The interference information may relate, for example, to signal transmission from at least one neighbor cell. The interference information may relate to uplink interference at the serving cell. The interference information may relate to one or more load indicator (LI) signals. The receiving may include, for example, receiving the one or more load indicator signals from a corresponding one or more network nodes operating in one or more neighbor cells.

The parameter may include, for example, a transmit power metric. The determining may include, for example, determining the transmit power metric based at least in part on the one or more load indicator signals.

The interference information may relate, for example, to downlink interference at a user terminal served by the serving cell. The interference information may relate to future scheduling information (FSI), which may include information regarding planned future downlink transmissions in one or more subbands. The FSI may include RNTP information which may be related to a planned downlink transmission in the neighbor cell. The FSI may include power per antenna information associated with future downlink transmissions, phase or phase offset per antenna information, and/or other information related to future transmissions from the neighbor cell. The interference information may be sent from the neighboring cell using Over the Air (OTA) signaling.

The parameter may include, for example, adjusted channel state information (CSI). The adjusted CSI may include CQI information that may be adjusted based at least in part on the FSI. The adjusted channel state information may include one or more of CQI, PMI and RI.

In another aspect, the disclosure relates to a computer program product. The computer program product may be configured to cause a computer to perform one or more the above-described processes.

In another aspect, the disclosure relates to a communications device. The communication device may be configured to implement one or more of the above-described processes.

In another aspect, the disclosure relates to a communications device. The communication device may include means for implementing one or more the above-described processes.

Various additional aspects and details are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
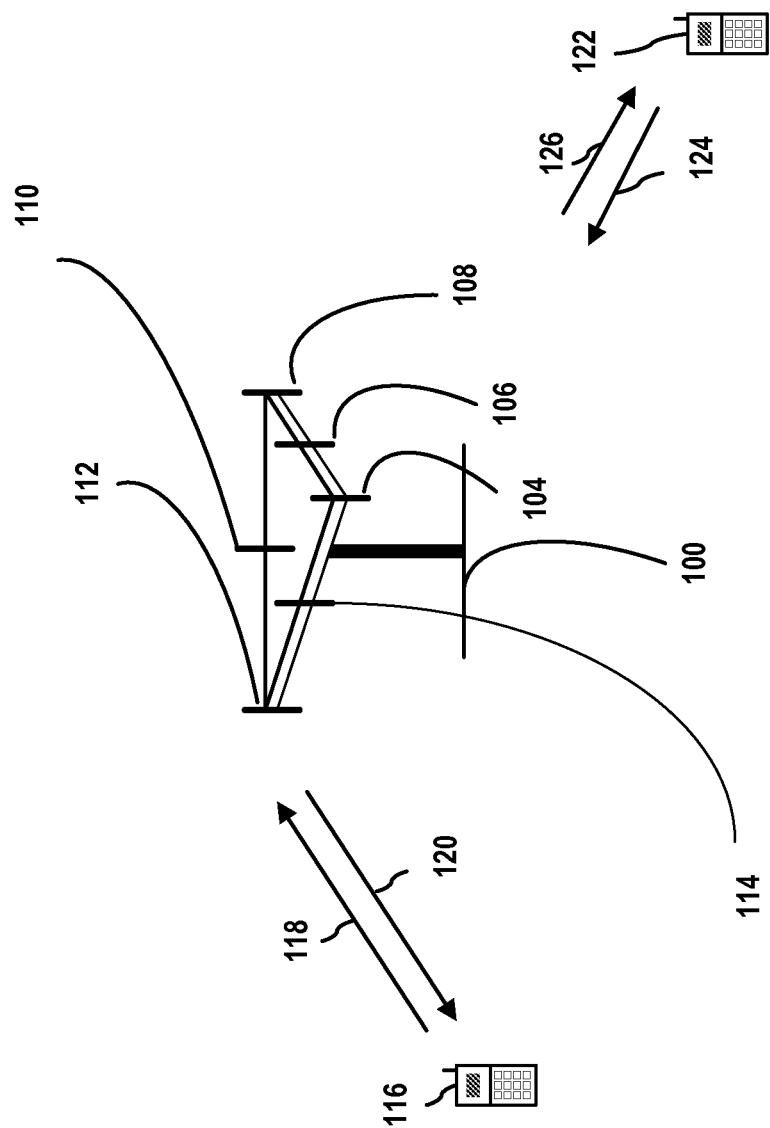
FIG. 1 illustrates details of a wireless communications system.

This disclosure is directed generally to wireless communications systems. More particularly, but not exclusively, the application relates to methods and apparatus for providing over the air (OTA) load indication and relative narrowband transmit power (RNTP) signaling to facilitate inter-cell interference coordination (ICIC) and associated processing and scheduling in wireless communications systems. In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, as well as other communications networks. As described herein, the terms "networks" and "systems" may be used interchangeably.

Before describing aspects, details and terminology associated with various communication systems on which embodiments may be implemented are further described below.

Radio technologies such as Universal Terrestrial Radio Access (UTRA), cdma2000 and the like. UTRA includes Wideband-CDMA (W-CDMA) and Low Chip Rate (LCR) may be implemented using DDMA. Cdma2000 covers IS-2000, IS-95 and IS-856 standards. Radio technology such as Global System for Mobile Communications (GSM) may be implemented using TDMA. Radio technology such as Evolved UTRA (E-UTRA), IEEE 802.11, IEEE 802.16, IEEE 802.20, Flash-OFDM and the like, may be implemented using OFDMA. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art.

For clarity, certain aspects of the apparatus and techniques are described below for LTE implementations, and LTE terminology is used in much of the description below; however, the description is not intended to be limited to LTE applications. Accordingly, it will be apparent to one of skill in the art that the apparatus and methods described herein may be applied to various other communications systems and applications.

Single carrier frequency division multiple access (SC-FDMA), which utilizes single carrier modulation and frequency domain equalization, is a technique that may be used in 3GTPP Long Term Evolution (LTE) or other communication systems. SC-FDMA has similar performance and essentially the same overall complexity as OFDMA implementations. SC-FDMA signal has lower peak-to-average power ratio (PAPR) because of its inherent single carrier structure, and is currently a working assumption for uplink multiple access scheme in LTE.

Logical channels in wireless communications systems may be classified into Control Channels and Traffic Channels. Logical Control Channels may include a Broadcast Control Channel (BCCH) which is a downlink (DL) channel for broadcasting system control information, a Paging Control Channel (PCCH) which is a DL channel that transfers paging information and a Multicast Control Channel (MCCH) which is a point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a point-to-point bi-directional channel that transmits dedicated control information and is used by UEs having an RRC connection.

Logical Traffic Channels may include a Dedicated Traffic Channel (DTCH) which is point-to-point bi-directional channel, dedicated to one UE, for the transfer of user information, and a Multicast Traffic Channel (MTCH) for Point-to-multipoint DL channel for transmitting traffic data.

Transport Channels may be classified into downlink (DL) and uplink (UL) Transport Channels. DL Transport Channels may include a Broadcast Channel (BCH), Downlink Shared Data Channel (DL-SDCH) and a Paging Channel (PCH). The PCH may be used for support of UE power saving (when a DRX cycle is indicated by the network to the UE) broadcast over an entire cell and mapped to Physical Layer (PHY) resources which can be used for other control/traffic channels. The UL Transport Channels may include a Random Access Channel (RACH), a Request Channel (REQCH), an Uplink Shared Data Channel (UL-SDCH) and a plurality of PHY channels. The PHY channels may include a set of DL channels and UL channels.

In addition, the DL PHY channels may include the following:

Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels may include the following:

Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

The word "exemplary" is used herein to mean "serving as an example, instance, or illustration." Any aspect and/or embodiment described herein as "exemplary" is not necessarily to be construed as preferred or advantageous over other aspects and/or embodiments.

For purposes of explanation of various aspects and/or embodiments, the following terminology and abbreviations may be used herein:

| | |
|---|---|
| AM | Acknowledged Mode |
| AMD | Acknowledged Mode Data |
| ARQ | Automatic Repeat Request |
| BCCH | Broadcast Control CHannel |
| BCH | Broadcast CHannel |
| C- | Control- |
| CCCH | Common Control CHannel |
| CCH | Control CHannel |
| CCTrCH | Coded Composite Transport Channel |
| CP | Cyclic Prefix |
| CRC | Cyclic Redundancy Check |
| CTCH | Common Traffic CHannel |
| DCCH | Dedicated Control CHannel |
| DCH | Dedicated CHannel |
| DL | DownLink |
| DSCH | Downlink Shared CHannel |
| DTCH | Dedicated Traffic CHannel |
| FACH | Forward link Access CHannel |
| FDD | Frequency Division Duplex |
| L1 | Layer 1 (physical layer) |
| L2 | Layer 2 (data link layer) |
| L3 | Layer 3 (network layer) |
| LI | Length Indicator |
| LSB | Least Significant Bit |
| MAC | Medium Access Control |
| MBMS | Multimedia Broadcast Multicast Service |
| MCCH | MBMS point-to-multipoint Control CHannel |
| MRW | Move Receiving Window |
| MSB | Most Significant Bit |
| MSCH | MBMS point-to-multipoint Scheduling CHannel |
| MTCH | MBMS point-to-multipoint Traffic CHannel |
| PCCH | Paging Control CHannel |
| PCH | Paging CHannel |
| PDU | Protocol Data Unit |
| PHY | PHYsical layer |

-continued

| | |
|---|---|
| PhyCH | Physical CHannels |
| RACH | Random Access CHannel |
| RLC | Radio Link Control |
| RRC | Radio Resource Control |
| SAP | Service Access Point |
| SDU | Service Data Unit |
| SHCCH | SHared channel Control CHannel |
| SN | Sequence Number |
| SUFI | SUper FIeld |
| TCH | Traffic CHannel |
| TDD | Time Division Duplex |
| TFI | Transport Format Indicator |
| TM | Transparent Mode |
| TMD | Transparent Mode Data |
| TTI | Transmission Time Interval |
| U- | User- |
| UE | User Equipment |
| UL | UpLink |
| UM | Unacknowledged Mode |
| UMD | Unacknowledged Mode Data |
| UMTS | Universal Mobile Telecommunications System |
| UTRA | UMTS Terrestrial Radio Access |
| UTRAN | UMTS Terrestrial Radio Access Network |
| MBSFN | Multicast broadcast single frequency network |
| MCE | MBMS coordinating entity |
| MCH | Multicast channel |
| DL-SCH | Downlink shared channel |
| MSCH | MBMS control channel |
| PDCCH | Physical downlink control channel |
| PDSCH | Physical downlink shared channel |

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement and the like. MIMO systems using multiple antennas generally provide for coordination of sending of reference signals between antennas, however, LTE systems do not in general provide for coordination of sending of reference signals from multiple base stations or eNBs.

3GPP Specification 36211-900 defines in Section 5.5 particular reference signals (RSs) for demodulation, associated with transmission of PUSCH or PUCCH, as well as sounding, which is not associated with transmission of PUSCH or PUCCH. For example, Table 1 lists some reference signals for LTE implementations that may be transmitted on the downlink and uplink and provides a short description for each reference signal. A cell-specific reference signal may also be referred to as a common pilot, a broadband pilot and the like. A UE-specific reference signal may also be referred to as a dedicated reference signal.

TABLE 1

| Link | Reference Signal | Description |
|---|---|---|
| Downlink | Cell Specific Reference Signal (CRS) | Reference signal sent by a base station/eNode B and used by the UEs for channel estimation and channel quality measurement. |
| Downlink | UE Specific Reference Signal | Reference signal sent by a base station/eNode B to a specific UE and used for demodulation of a downlink transmission from the Node B. |

TABLE 1-continued

| Link | Reference Signal | Description |
|---|---|---|
| Uplink | Sounding Reference Signal | Reference signal sent by a UE and used by a Node B for channel estimation and channel quality measurement. |
| Uplink | Demodulation Reference Signal | Reference signal sent by a UE and used by a Node B for demodulation of an uplink transmission from the UE. |

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in 3GPP TS 36.211.

UMTS LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an exemplary implementation, in the time domain there is a defined radio frame that is 10 ms long and consists of 10 sub frames of 1 ms each. Every sub frame consists of 2 slots, where each slot is 0.5 ms. The subcarrier spacing in the frequency domain in this case is 15 kHz. Twelve of these subcarriers together (per slot) constitutes an RB, so in this implementation one resource block is 180 kHz. 6 Resource blocks fit in a carrier of 1.4 MHz and 100 resource blocks fit in a carrier of 20 MHz.

In the downlink there are typically a number of physical channels as described above. In particular, the PDCCH is used for sending control, the PHICH for sending ACK/NACK, the PCFICH for specifying the number of control symbols, the Physical Downlink Shared Channel (PDSCH) for data transmission, the Physical Multicast Channel (PMCH) for broadcast transmission using a Single Frequency Network, and the Physical Broadcast Channel (PBCH) for sending important system information within a cell. Supported modulation formats on the PDSCH in LTE are QPSK, 16QAM and 64QAM.

In the uplink there are typically three physical channels. While the Physical Random Access Channel (PRACH) is only used for initial access and when the UE is not uplink synchronized, the data is sent on the Physical Uplink Shared Channel (PUSCH). If there is no data to be transmitted on the uplink for a UE, control information would be transmitted on the Physical Uplink Control Channel (PUCCH). Supported modulation formats on the uplink data channel are QPSK, 16QAM and 64QAM.

In 3GPP LTE, a mobile station or device may be referred to as a "user device" or "user equipment" (UE). A base station may be referred to as an evolved NodeB or eNB. A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

One function performed by access terminals (ATs) or user equipments (UEs) in wireless communication systems, such as LTE systems, relates to interference and path loss determinations for surrounding transmitters that may be in adjacent or neighboring cells. These determinations may be employed in identifying network base stations, performing handoff determinations, managing interference between network cells, or other inter-network or ICIC functions. Depending on various conditions (e.g., current network load, prevailing wireless conditions, channel quality, path loss on one or more wireless links, etc.), it may be desirable to schedule UE transmissions on particular resources and/or at particular transmit powers in a manner that mitigates interference to neighboring cells and associated base stations. In order to control scheduling, it may be desirable to provide over the air (OTA) load indication signaling to UEs or other wireless nodes in adjacent or neighboring cells. The UEs may use this information, and/or additional information, to determine a transmit power metric, which may be reported to a serving base station, such as an eNB. In addition, it may be desirable to minimize interference over thermal noise (IoT), and maximize data throughput for wireless communications in various aspects.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents. Accordingly, it should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates details of aspects of an example multiple access wireless communication system, such as an LTE system. An evolved Node B (eNB) 100 (which may also be denoted as an access point or AP) includes multiple antenna groups, one including 104 and 106, another including 108 and 110, and an additional including 112 and 114. In FIG. 1, only two antennas are shown for each antenna group, however, more or fewer antennas may be utilized for each antenna group. A user equipment (UE) 116 (also known as a user terminal, access terminal, or AT) is in communication with antennas 112 and 114, where antennas 112 and 114 transmit information to UE 116 over downlink 120 and receive information from UE 116 over uplink 118. A second UE 122 is in communication with antennas 106 and 108, where antennas 106 and 108 transmit information to UE 122 over downlink 126 and receive information from access terminal 122 over uplink 124. In a frequency division duplex (FDD) system, communication links 118, 120, 124 and 126 may use different frequency for communication. For example, downlink 120 may use a different frequency then that used by uplink 118. In a time division duplex (TDD) system, downlinks and uplinks may be shared.

Figure 2:
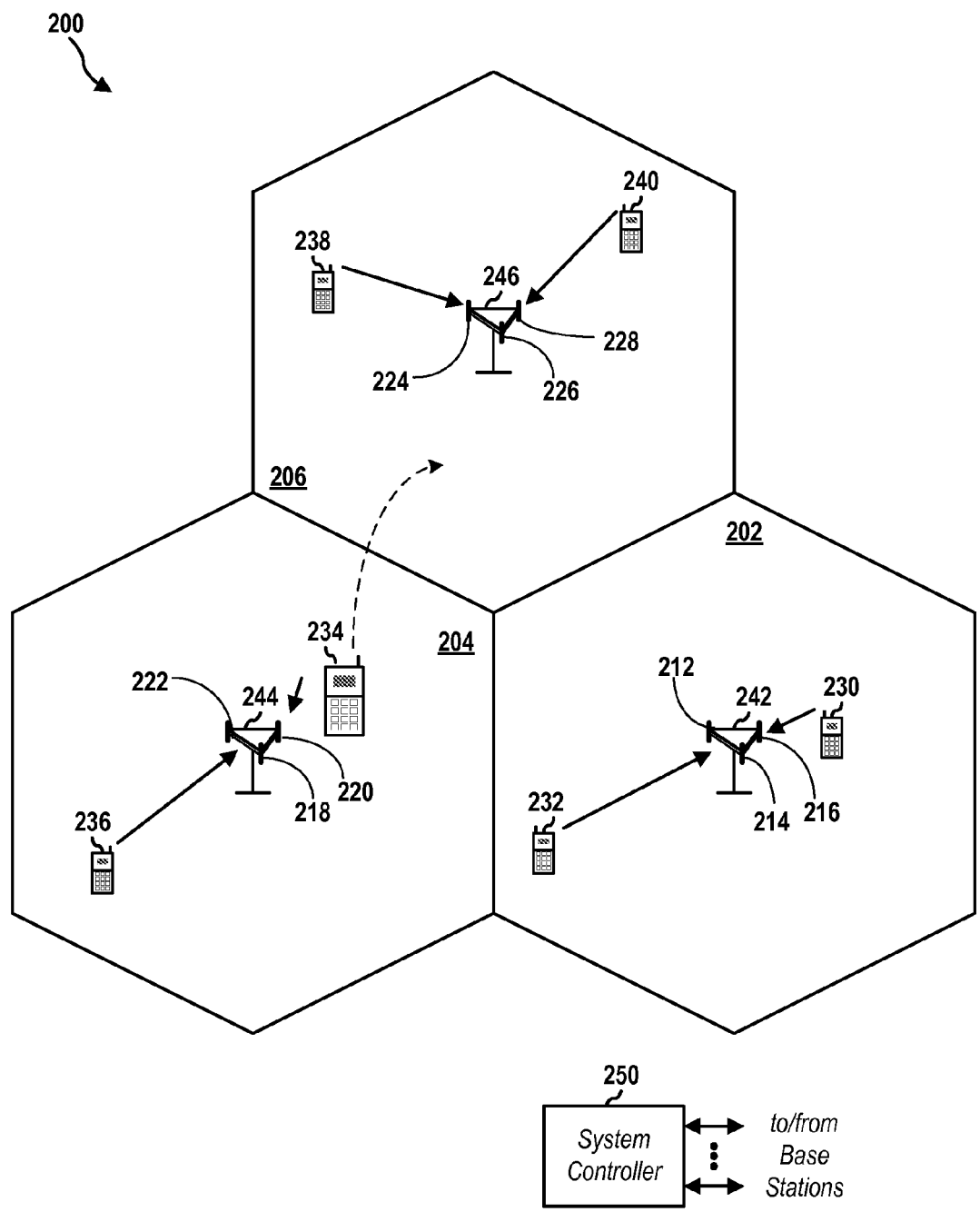
FIG. 2 illustrates details of a wireless communications system having multiple cells and associated wireless network nodes.

FIG. 2 illustrates details of aspects of an example multiple access wireless communication system 200, such as an LTE communication system. The multiple access wireless communication system 200 includes multiple cells, including cells 202, 204, and 206 that may be neighboring or adjacent. In one aspect, one or more of the cells 202, 204, and 206 may include an eNB that includes multiple sectors. The multiple sectors can be formed by groups of antennas with each antenna responsible for communication with UEs in a portion of the cell, such as described previously with respect to FIG. 1. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204 and 206 can include several wireless communication devices, e.g., user equipment (UEs), which communicate with one or more sectors of each cell 202, 204 or 206. For example, UEs 230 and 232 can be in communication with eNB 242, UEs 234 and 236 can be in communication with eNB 244, and UEs 238 and 240 can be in communication with eNB 246. UEs may be able to receive signals from adjacent cells and associated eNBs. For example, UE 234 may be associated with serving node eNB 244, however, UE 234 may also be able to receive signals from adjacent cells 202 and 206 from corresponding eNBs 242 and 246. These signals may include Loading Indicator (LI, which may also be denoted as Overloading Indicator) signaling and/or Future Scheduling Information (FSI), which may be Relative Narrowband Transmit Power (RNTP) signaling, as well as other signaling as further described below. eNBs such as eNBs 242, 244, and 246 may be in communication with a system controller 250, which may further provided connectivity to backhaul and Core Network (CN) components and functions.

Certain distributed functions and processing may be done in some implementations by direct communications or negotiations between eNBs such as those shown in FIG. 2. For example, eNBs may communicate directly to coordinate orthogonalization to mitigate inter-cell interference as further described subsequently herein.

Figure 3A:
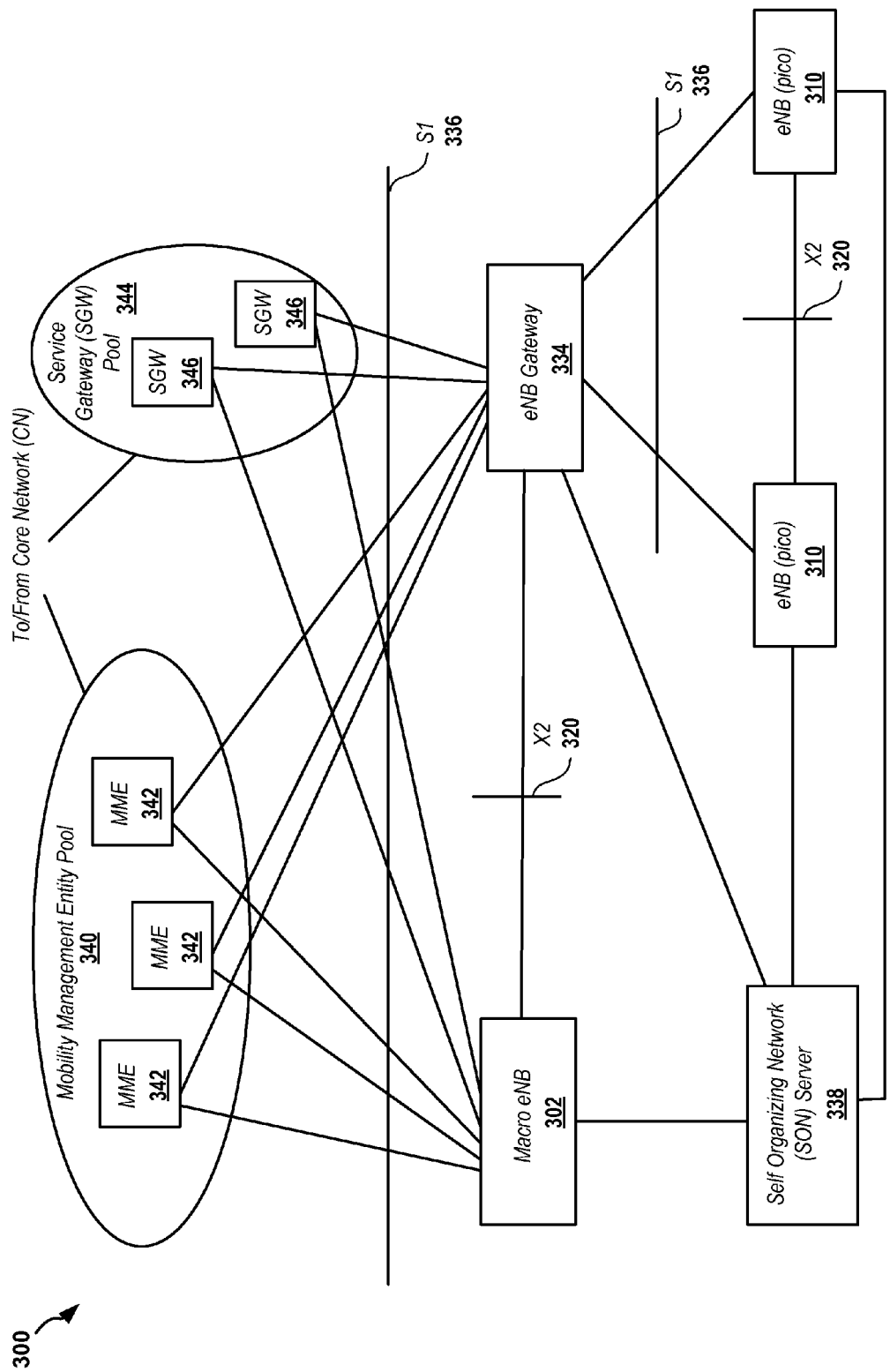
FIG. 3A illustrates details of one embodiment of inter-cell coordination between wireless network nodes.

FIG. 3A illustrates details of an embodiment of a network 300A illustrating details of example eNB interconnection with other eNBs, such as may be used to facilitate coordination for inter-cell orthogonalization and interference cancellation using direct and/or backhaul connectivity. Network 300A includes a macro-eNB 302 and multiple additional eNBs, which may be picocell or femtocell eNBs 310. Network 300A may include an HeNB gateway 334 for scalability reasons. The macro-eNB 302 and the gateway 334 may each communicate with a pool 340 of mobility management entities (MME) 342 and/or a pool 344 of serving gateways (SGW) 346. The eNB gateway 334 may appear as a C-plane and a U-plane relay for dedicated S1 backhaul connections 336. An S1 connection may be a logical interface specified as the boundary between an evolved packet core (EPC) and an Evolved Universal Terrestrial Access Network (EUTRAN). As such, it provides an interface to a core network or CN (not shown) which may be further coupled to other networks. The eNB gateway 334 may act as a macro-eNB 302 from an EPC point of view. The C-plane interface may be S1-MME and the U-plane interface may be S1-U.

The eNB gateway 334 may act towards an eNB 310 as a single EPC node and may ensure S1-flex connectivity for an eNB 310. The eNB gateway 334 may provide a 1:n relay functionality such that a single eNB 310 may communicate with n MMEs 342. The eNB gateway 334 registers towards the pool 340 of MMEs 342 when put into operation via the S1 setup procedure. The eNB gateway 334 may support setup of S1 connections 336 with the eNBs 310.

Network 300A may also include a self-organizing network (SON) server 338. The SON server 338 may provide automated optimization of a 3GPP LTE network. The SON server 338 may be a key driver for improving operation, administration, and maintenance (OA&M) functionality in wireless communication system 300A.

An X2 link 320 may exist between the macro-eNB 302 and the eNB gateway 334. X2 links 320 may also exist between each of the eNBs 310 connected to a common eNB gateway 334. The X2 links 320 may be set up based on input from the SON server 338. An X2 link 320 may convey ICIC information. If an X2 link 320 cannot be established, the S1 connection 336 may be used to convey ICIC information. Backhaul signaling may be used in system 300A to manage various functionality, such as described further herein, between base stations or eNBs. For example, these connections may be used as further described successively herein to facilitate subband orthogonalization coordination and scheduling.

Figure 3B:
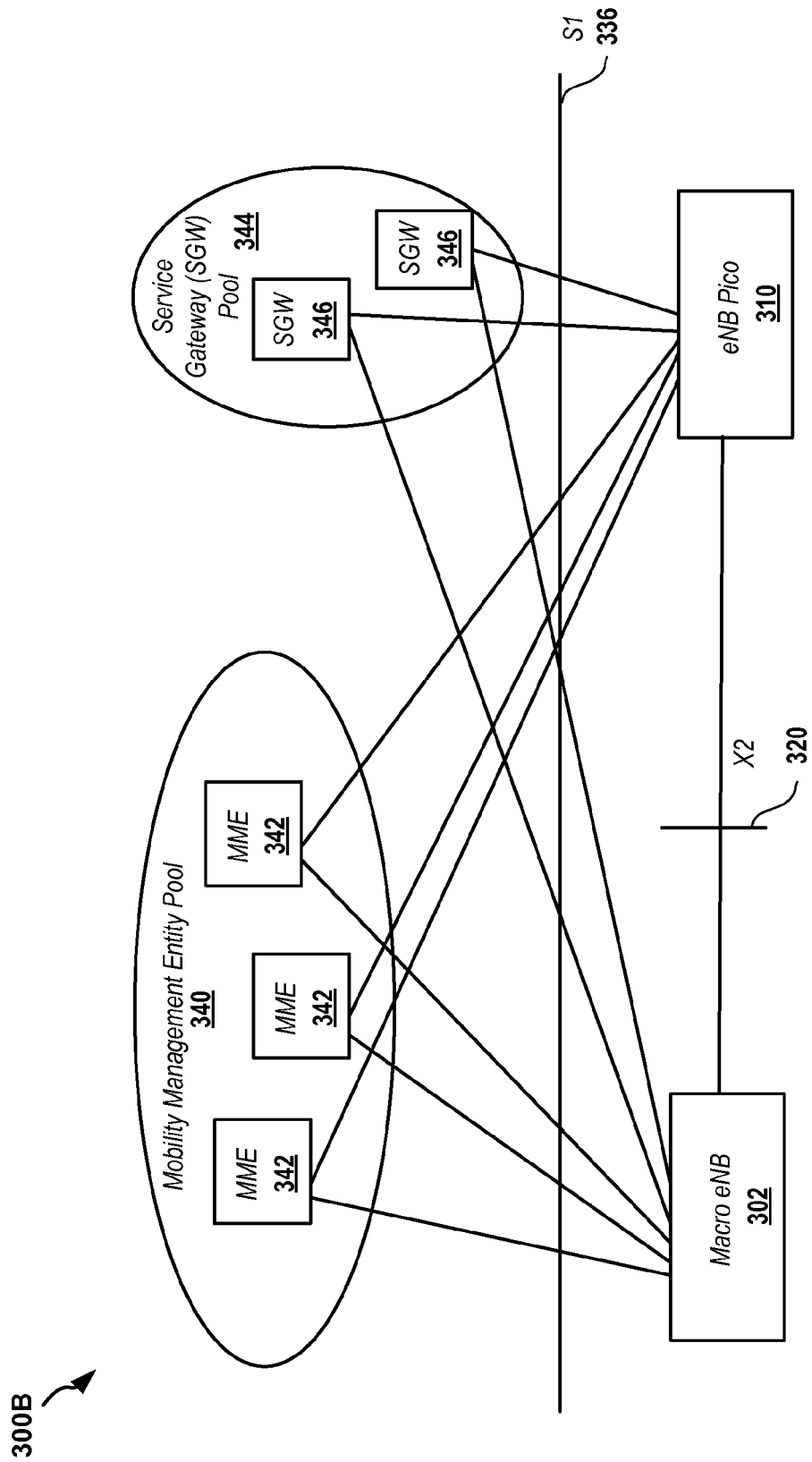
FIG. 3B illustrates details of another embodiment of inter-cell coordination between wireless network nodes.

FIG. 3B illustrates a similar network configuration 300A without an SON server. In this configuration, eNBs, such as macro-eNB 302 and pico or femto eNBs 310 may communicate directly via an X2 connection 320 as shown.

Figure 4:
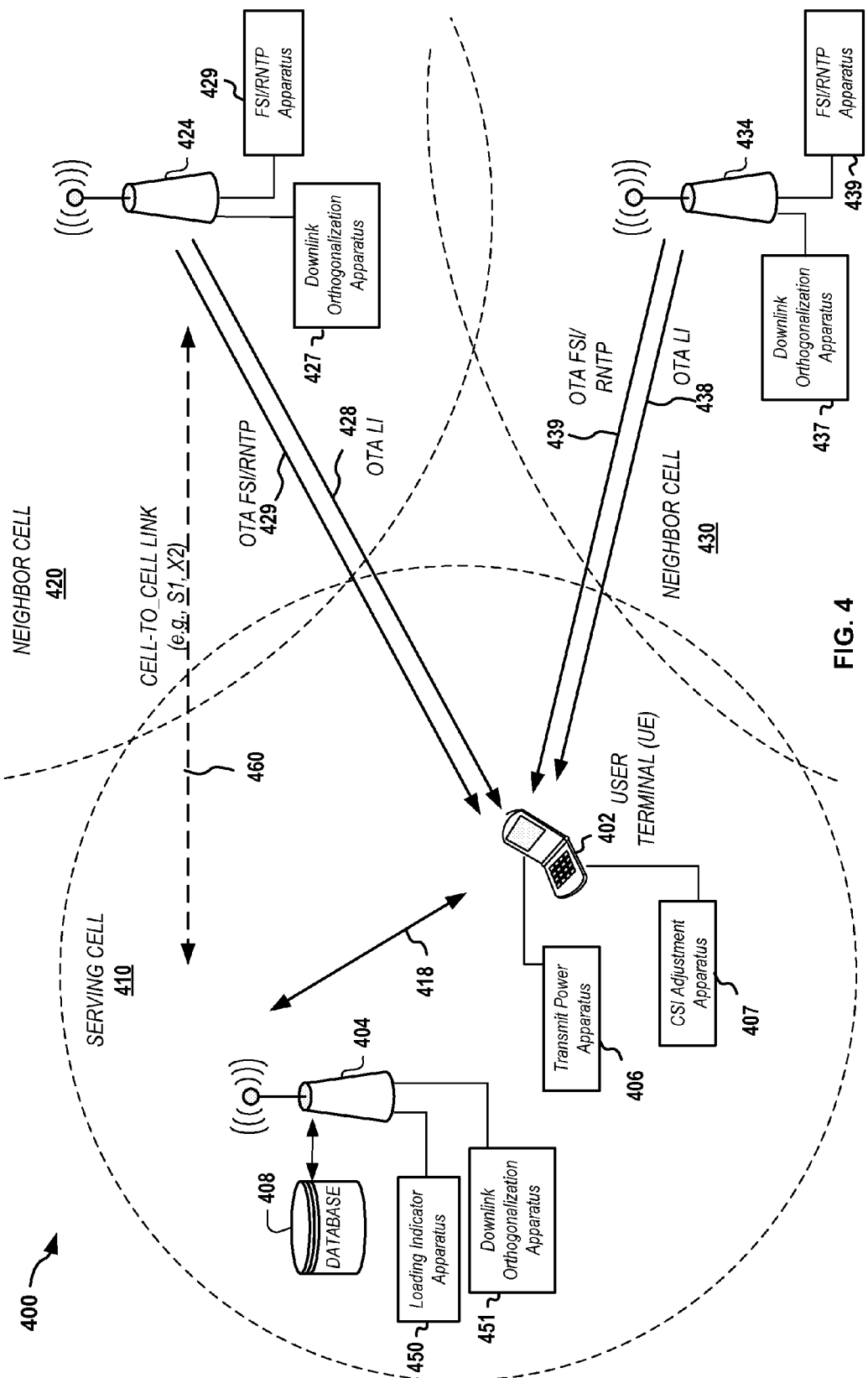
FIG. 4 illustrates details of an embodiment of a wireless communication system on which embodiments of inter-cell interference coordination may be implemented.

FIG. 4 illustrates details of an example embodiment of a wireless communication system 400 on which embodiments of inter-cell interference coordination (ICIC) in accordance with various aspects may be implemented. System 400 includes a UE 402 in communication with a serving eNB (or base station or equivalent wireless network node) 404 via wireless link 418, which may include an uplink (UL) and a downlink (DL) connection. eNB 404 may be associated with a serving cell 410. In addition, UE 402 may be in wireless range of one (or more) adjacent or neighboring cells 420 and/or 430, which may be served by eNBs 424 and 434 respectively. Cell to cell communication may be done via an inter-cell link, such as an S1 or X2 connection 460 as shown between cells 410 and 420 and associated eNBs 404 and 424. Other X2 connections between cells, such as between cells 410 and 430, or 420 and 430 (not shown) may also be configured.

UE 402 may receive system data from serving cell node 404 in furtherance of the inter-cell interference coordination via a downlink component of link 418, and may also receive other data or information depending on the connection mode. UE 402 may also send data to node 404 via an uplink component of link 418 to further inter-cell interference coordination as further described subsequently herein.

For example, the system data may include receiver sensitivity information for one or more of the neighboring cells 420, 430, aggregated receiver sensitivity data (e.g., average receiver sensitivity), and/or nominal sensitivity data where specific data is not available. Additionally, the system data may include transmit power of nodes of the respective neighboring cells 420 and 430 (e.g., nodes 424 and 434), and/or other cells and associated nodes not shown.

The system data may be employed by a transmit power apparatus 406 which may be incorporated as a module in UE 402 for determining a suitable transmit power metric to be used to facilitate interference mitigation with neighboring cells 420, 430 (or other cells not shown). The transmit power metric may be based at least in part on receiver sensitivity data and/or other data as described further herein. In addition, the transmit power metric may be based at least in part on a measure of network interference observed by the respective neighboring cells 420, 430 (and/or other cells not shown). For example, a downlink signal may be received at UE 402 from signal path 428, which may then be used to generate transmit power metric data based on the signal. Likewise, a downlink signal 438 may be received from eNB 434 of cell 430 and similarly used either alone or in conjunction with the signal from eNB 424 to generate transmit metric data. The transmit power metric may also be based on wireless conditions, such as path loss or other information as further described herein. The transmit power metric may be based on wireless conditions, such as path loss or other information as further described herein.

UE 402 may send information based on signals received from neighboring cells such as cells 420 and/or 430 to serving base station 404. This information may be, for example, adjusted Channel State Information (CSI) and/or other information related to signals received from adjacent cells that may be used to facilitate inter-cell interference coordination. For example, a downlink signal may be received at UE 402 from downlink 429, which may then be used to generate adjusted CQI report information and/or other information for facilitating ICIC. Likewise, a downlink signal may be received from downlink 439 from eNB 434 of cell 430 and similarly used either alone or in conjunction with the signal from eNB 424 to generate adjusted CQI report information and/or other information for facilitating ICIC. The transmit power metric may also be based on wireless conditions, such as path loss or other information as further described herein. CSI adjustment apparatus 407 may be configured to receive a signal including Future Scheduling Information (FSI), which may include RNTP data, such as data associated with transmit power and/or other information, such as information associated with power per antenna, power per phase, and/or other similar or related information, from an adjacent base station and may use this information to generate adjusted CSI data or information, such as, for example, CQI report information adjusted based on the FSI.

eNB 404 may also include a Downlink Orthogonalization Module 451, which may be configured to receive information related to interference generated on a downlink from an adjacent cell node, such as eNB 424 and/or eNB 434, and orthogonalize downlink data transmissions to facilitate inter-cell interference mitigation. eNBs 424 and 434 may include similar Orthogonalization Modules 427 and 437 (not shown), respectively. In addition, neighbor cell base stations eNB 424 and/or eNB 434 may include an FSI/RNTP apparatus configured to generate and transmit, such as to UE 402, Future Scheduling Information. The FSI may be in the form of RNTP data, such as an RNTP bitmap as described subsequently herein. eNB 404 may similar include an FSI/RNTP apparatus (not shown).

Figure 5:
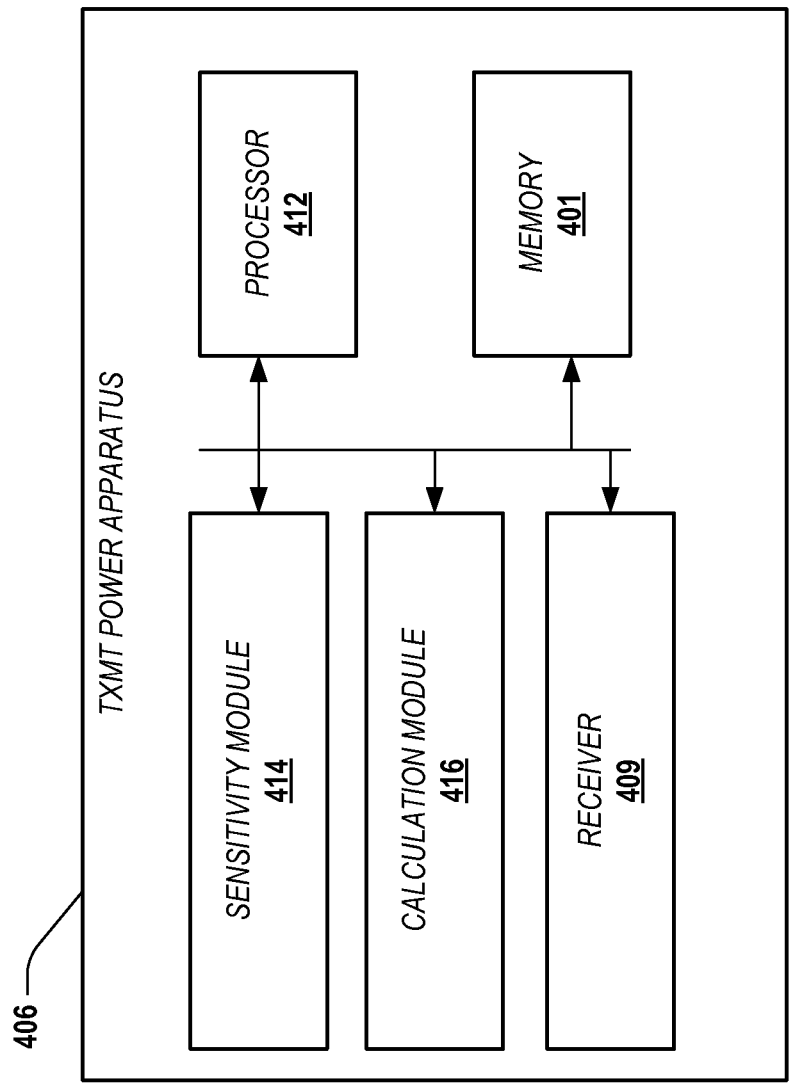
FIG. 5 illustrates details of an embodiment of a transmit power apparatus.

FIG. 5 illustrates details of one embodiment of a transmit power apparatus 406. Power apparatus 406 may include a data processor element 412, which may be a standalone processor and/or a processing element of UE 402. Apparatus 406 may further include a receiver module 409 configured to receive signals from serving base stations, such as eNB 404, as well as other base stations, such as adjacent base stations 424 and 434. Processor 412 may be configured to activate transmit power apparatus 406 when UE 402 wakes up, such as from an inactive state. In this case, transmit power apparatus 406 may analyze loading indicator information and/or system data or information upon activating or transitioning to a new cell.

In another aspect, a discontinuous receive (DRX) procedure may be modified such that the data processor activates transmit power apparatus 406 in between active receive states. Alternately, variations of the foregoing aspects may be used, as well as other activation procedures based on appropriate operational events or conditions.

System data may be parsed by processor 412, and parsed data may be stored in memory 401. A receiver sensitivity module 414 may be included to identify receiver sensitivity data for respective neighboring cells 404A, 404B, and/or aggregated/nominal data. The sensitivity data may be forwarded to a calculation module 416, which may employ the sensitivity data in determining a transmit power metric for the UE 402. Additionally, calculation module 416 may employ a loading indicator (LI) signal and/or associated data provided by the respective neighboring cells 404A, 404B for the transmit power metric determination, as well as path loss data for the transmit power metric determination.

For example, calculation module 416 may employ a processing method of the following form for generating a transmit power metric. Assuming, for example, that there are k neighboring cells, for each neighboring cell, a computation of a maximum power per resource block ($P_{RBmax}$) each subframe, i (for each reporting subband) may be done. For example, the $P_{RBmax}$ for each adjacent cell may be computed in accordance with the following:

$$P_{RBmax} = Po_{PUSCH}\text{int}(k) + PL(i,k) + f(i,k);$$

where $Po_{PUSCHint}(k)$ is a receiver sensitivity value at the corresponding neighboring base station (eNB), k is the neighboring cell, i is the subframe index, PL(i, k) is a path loss metric that represents an estimated path loss towards the neighboring eNB, k, and f(i,k) is an accumulated over the air (OTA) interference correction, which may be determined as further described below.

In one implementation, the receiver sensitivity $Po_{PUSCH}\text{int}$ (k) value may be determined as follows:

$$Po_{PUSCH}\text{int}(k) = Po_{PUSCHnom}\text{int}(k) + Po_{PUSCHUE}\text{int};$$

Where $Po_{PUSCHnom}\text{int}(k)$ is a nominal receiver sensitivity associated with cell k, and $Po_{PUSCH}\text{int}$ is a UE specific offset value.

In some implementations, PL(i,k) and/or f(i,k) may be omitted or replaced with other similar, equivalent or additional parameters.

Subsequent to determining $P_{RBmax}$ (a) for each neighboring cell, a $P_{RBmax}$ per subframe value ($P_{RBmax}(i)$) may be generated at the UE. This metric may be based on a minimum $P_{RBmax}$ value among all neighboring or adjacent eNBs, for example;

$$P_{RBmax}(i) = \min_k(P_{RBmax}(i,k)).$$

The UE (e.g., UE 402) may then send the $P_{RBmax}(i)$ value as the transmit power metric.

In some implementations, PL(i,k) and/or f(i,k) may be omitted or replaced with other similar, equivalent or additional parameters. For example, in some embodiments, the nominal receiver sensitivity parameter PL(i,k) may also be a function of path loss difference, or may be a path loss value alone.

Figure 7:
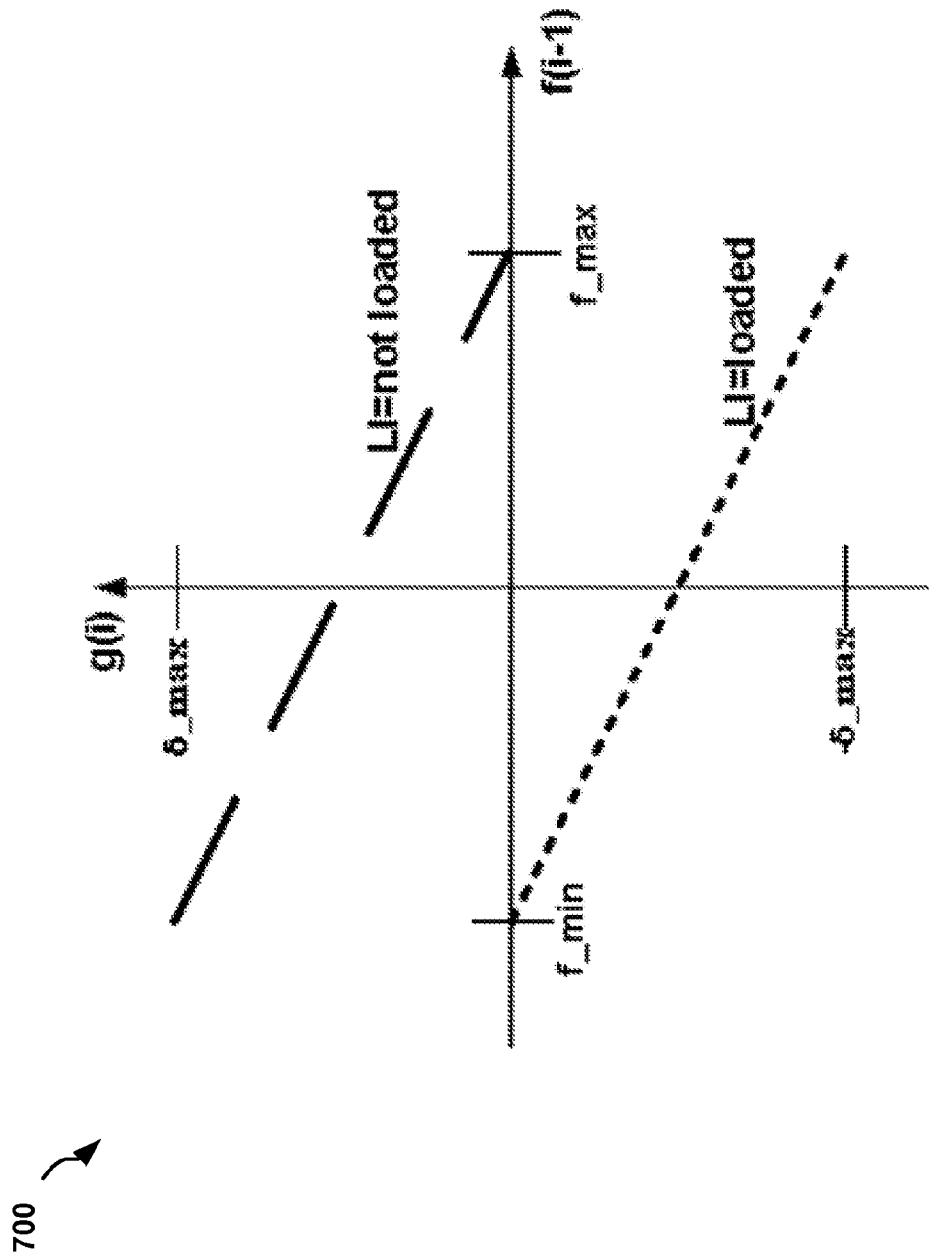
FIG. 7 illustrates details of an embodiment of a functional mapping of load indicator values for loaded and not-loaded states.

The accumulated OTA interference correction, f(i,k), represents accumulated correction. In one embodiment, it may be generated based on processing a one bit value as shown in FIG. 7 using a predefined function, g(i), where g(i) may be a function of f(i−1) (e.g., the loading associated with a previous subframe, i−1), as shown. It is noted that, while FIG. 7 illustrates a particular functional relationship (e.g., linear interpolation between boundary values $f_{min}$ and $f_{max}$) for the loaded and unloaded case, other functions, such as nonlinear functional relationships for g(i) where $f_{min} \leq f(i-1) \leq f_{max}$ may alternately be used in various implementations. For example, exponential, square law, power law, or other functions may be used.

For an OTA Load Indicator above a threshold target:

at $f(i-1)=f_{min}, g(i)=0$; and at $f(i-1)=f_{max}, g(i)=-\delta_{max}$

For an OTA Load Indicator below the threshold target:

at $f(i-1)=f_{max}, g(i)=\delta_{max}$ and at $f(i-1)=f_{max}, g(i)=0$ where g(i) is a function of f(i−1), and f(i)=sum from j=0 to j=i of g(j).

For the above or equivalent processing, an interference correction f(i) for a given resource block may be based on current wireless conditions, and/or on the previous subframe 'i−1,' and/or a combination of prior subframes. Additionally, if the OTA loading indicator (physical broadcast channel— PBCH) is erased, the processing can assume the loading indicator is above the threshold target if, at f(i−1), g(i)>0, assume the loading indicator is below the threshold target if, at f(i−1), g(i)<0, and set g(i)=0 if f(i−1)=0. An example mapping between f(i−1) and g(i) is illustrated in FIG. 7, where the mapping is linear. However, other functional relationships, such as exponential, square law or other power law, and/or other relationships that are monotonically increasing or decreasing may be used in various embodiments.

In addition, although the above example described processing based on a one-bit algorithm, two-bit or larger bit size processing logic may be used in some implementations. For example, a two-bit processing algorithm may be employed instead of the one-bit algorithmic logic. For one example two-bit processing algorithm, four states may be provided, which may be very high load, above-target load, below-target load and very light load.

For the very high load state, the previously described OTA Load Indicator processing can, for example, be performed twice, potentially resulting in two interference offset corrections based on g(i). For the load above target and load below target states, the OTA Load Indicator processing may be performed once, and may therefore be the same as the one-bit processing described previously.

For the very light load state, the processing may also be executed twice, and in some implementations may result in two interference offset corrections (upward) based on g(i).

In either of these cases (i.e., whether for the one-bit case, two-bit case or other bit configurations), the results may be used by calculation module 412 to generate the transmit power metric, per resource block in subframe 'i', per neighboring cell 'k,' which may result in a minimum value metric as described previously.

The transmit power metric may then be sent to a base station (e.g., eNB) 404 in serving cell 410. The base station/ serving cell may then calculate an uplink (UL) transmit policy and allocations for UE 402. This policy may be based on the transmit power metric, and the policy and allocation may be forwarded to UE 402. Upon receipt, UE 402 may implement the transmit policy, and then continue to monitor LI transmissions from neighboring cells and then generate transmit power metrics for subsequent subframes (e.g., subframe 'i+1').

Figure 6:
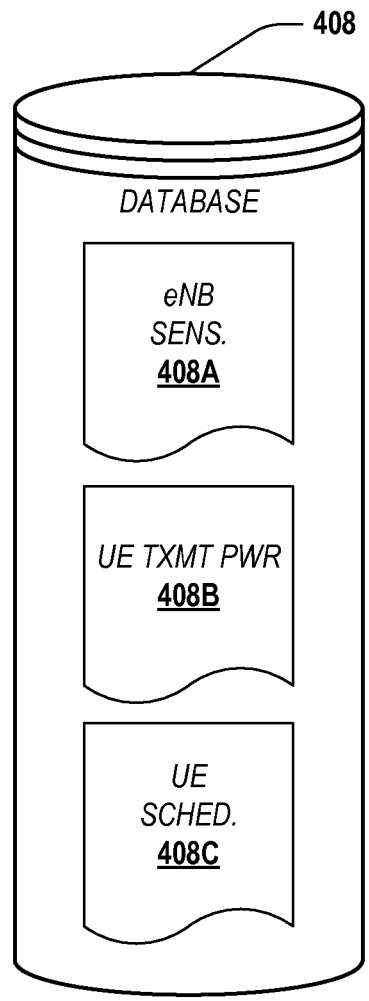
FIG. 6 illustrates details of an embodiment of a database on which various data and information may be stored.

In some implementations, serving cell base station 404 may be coupled with a database 408 configured to store data pertaining to the inter-cell interference coordination, with an example database 408 configuration illustrated in FIG. 6. For example, receiver sensitivity data may be stored in a first set of database entries or files 408A correlating wireless network nodes from the neighboring cells 420, 430 with respective receiver sensitivity data. Further, transmit power data submitted by UEs served by serving cell 410, such as UE 402, may be stored in a UE transmit power entry or file 408B. Additionally, UL schedules or other related data generated by the base station 404 may be stored in a UE scheduling entry or file 408C. Moreover, it should be appreciated that the respective files 408A, 408B, 408C may be updated over time, or appended over time, to include time-varying sensitivity, transmit power, scheduling information, and/or other information (not shown in FIG. 6). Such data may then be employed in adaptive inter-cell interference coordination, which may employ time-varying data as an optimization input.

Figure 8:
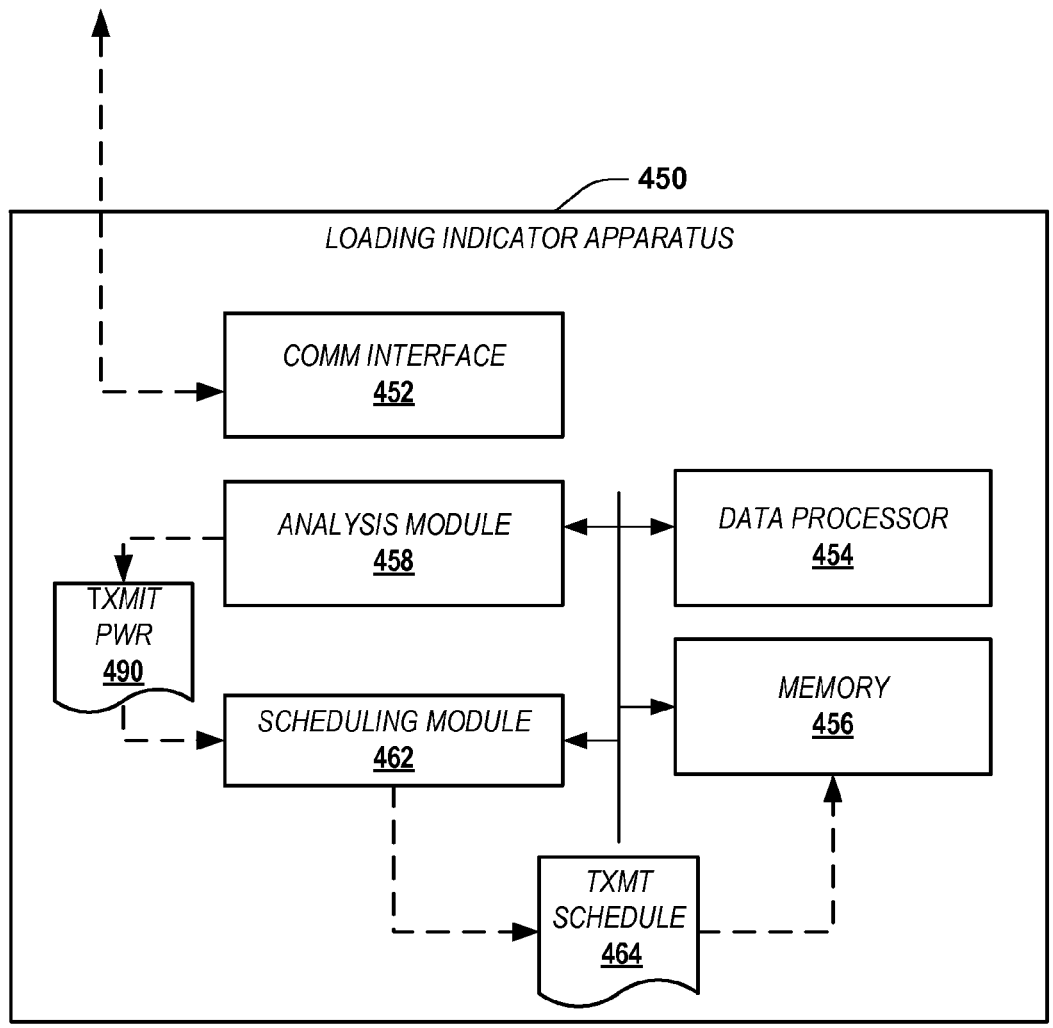
FIG. 8 illustrates details of an embodiment of a loading indicator apparatus.

FIG. 8 shows a block diagram of details of an embodiment of a loading indicator apparatus 450, according to aspects of the disclosure. Loading indicator apparatus 450 may be coupled to or incorporated into a base station, such as eNB 404 of FIG. 4.

In some implementations, loading indicator apparatus may be implemented as a component or element internal to the wireless network. For instance, apparatus 450 may be part of a terrestrial radio access network (e.g., coupled with an eNode B, a base station controller, or the like), or can be part of a wireless operator's core network coupled with the terrestrial radio access network (e.g., at a network gateway or other connection point).

Figure 16:
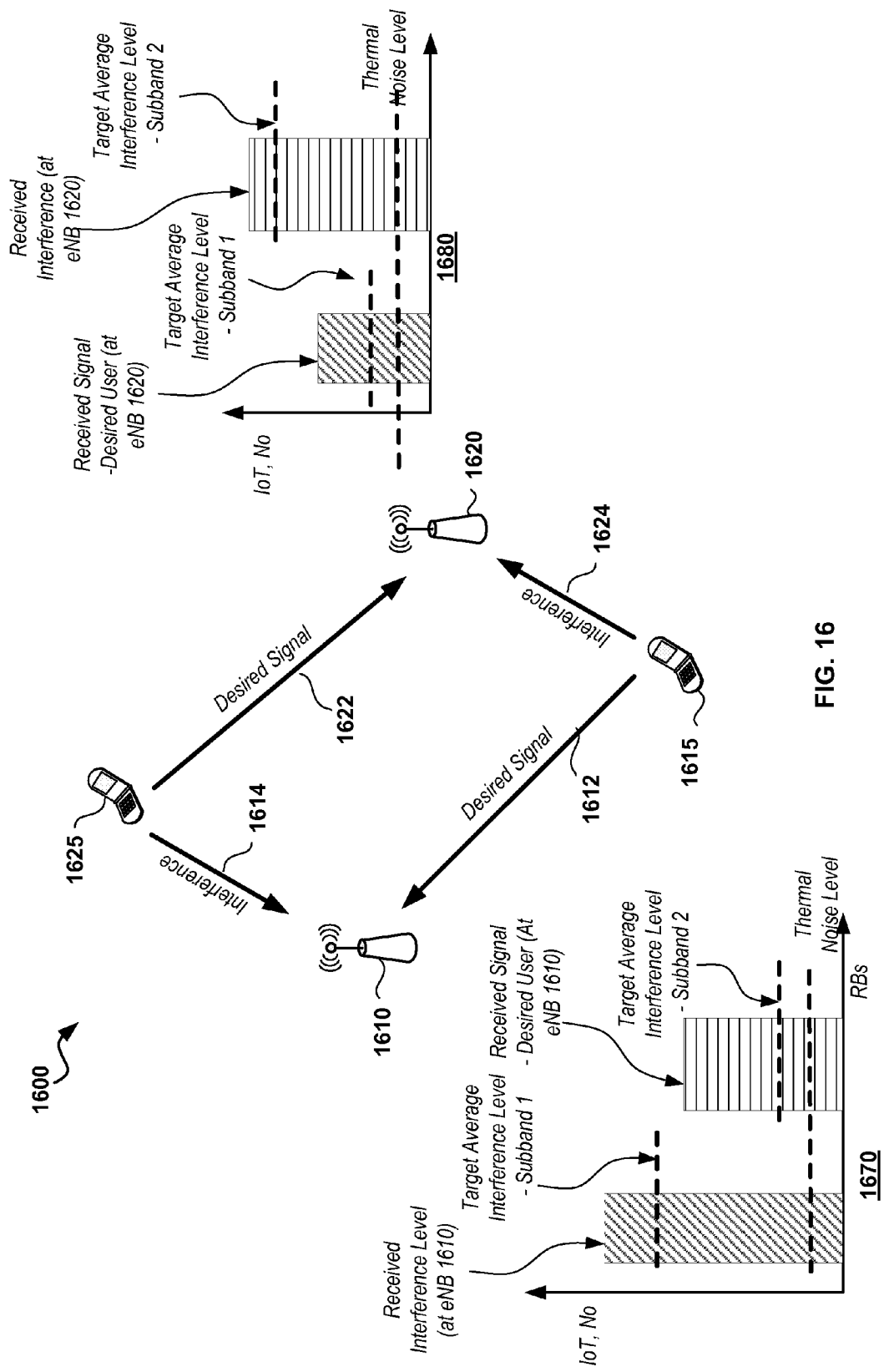
FIG. 16 illustrates details of an embodiment of a communication system on which uplink resource partitioning may be implemented.

In either case, loading indicator apparatus 450 may be configured to employ a communication interface 452 for wired or wireless signaling at least with the base station. In some aspects, the communication interface 452 may be further be coupled with a backhaul network connecting the base station with a set of neighboring base stations, such as, for example, is illustrated in FIGS. 2 and 3. In other aspects, the communication interface 452 may be further coupled with a base station controller managing the set of neighboring base stations (not shown). In one embodiment, the communication interface 452 may include a wireless interface that can be employed to wirelessly communicate with neighboring base stations, such as, for example, via an X2 connection, or to one or more user equipment (UEs) served by the base station. In one embodiment, communication interface 452 includes a transmit-receive chain of a wireless base station or eNB (such as, for example, is shown in FIG. 16 and described subsequently herein), or is coupled with such a transmit-receive chain.

In one aspect, communication interface 452 can be employed by loading indicator apparatus 450 to obtain receiver sensitivity information from the subset of nearby base stations. For example, this sensitivity information may be measured at each respective base station receiver and submitted to apparatus 450 (e.g., via communication interface 452), shared among the base stations (e.g., via a backhaul network or other interconnection configuration).

In another aspect, the sensitivity information may be nominal sensitivity information generated for the respective base stations by loading indicator apparatus 450.

The receiver sensitivity information may be stored in memory 456. The information may be stored per base station. Alternately or in addition, an average or other suitable aggregate of the sensitivity information may be stored in memory 456. The sensitivity data may be employed by an analysis module 458, executed by and/or incorporated with data processor 454. Specifically, analysis module 458 may be configured to attempt to identify base stations within a wireless range of one or more UEs served by loading indicator apparatus 450, and distribute receiver sensitivity information for in-range base stations to the respective UEs.

In another aspect, analysis module 456 may be configured to send aggregate sensitivity data (e.g., average sensitivity data, nominal sensitivity data where base station-specific data is not available, or other stored sensitivity data) to UEs served by loading indicator apparatus 450. In either case, the sensitivity data may be distributed with other system information, including transmit strength of the respective base stations (for path loss calculations), or other parameters such as those described elsewhere herein.

Analysis module 458 may employ a particular physical downlink channel (PDCH) dedicated for loading information to convey the receiver sensitivity data. Optionally, a physical uplink channel (PUCH) can be established for response information transmitted by UEs served by loading indicator apparatus 450. Communication interface 452 may be configured to monitor the PUCH for a response to the system information distributed by analysis module 458. In another aspect, where no dedicated PUCH is established, UEs may employ an uplink control channel or other uplink channel to transmit the responses to the base station coupled with loading indicator apparatus 450.

A response provided by a UE may include a transmit power metric 490, which may be determined per resource block for each neighboring base station analyzed by the UE as a minimum value of a maximum power per resource block across a plurality of cells ($P_{RBmax}$). Examples of this processing are described elsewhere herein.

The transmit power metric may be forwarded to a scheduling module 462 that may be configured to generate a UL transmit schedule 464 for the UE, which may be based at least in part on the transmit power metric. The transmit schedule 464 may be stored in memory 456, and transmitted to a UE, such as UE 402, as shown in FIG. 4. In general, the UE transmit schedule 464 is configured to facilitate reduction of inter-cell interference among the set of base stations. As one example, the UL transmit schedule 464 may specify a transmit power for the UE on selected UL resources. Optionally, the UL transmit schedule 464 may be configured to assign the UE to particular resources for mitigation of interference in the network. In either case, the UL transmit schedule 464 may be generated according to an inter-cell interference coordination methodology among multiple neighboring or adjacent base stations and associated cells so as to reduce network interference.

Although the aforementioned systems and modules illustrated in FIGS. 4-8 have been described with respect to interaction between several components, modules and/or communication interfaces, it should be appreciated that such systems and components/modules/interfaces can include those components/modules or sub-modules specified therein, some of the specified components/modules or sub-modules, and/or additional modules (not shown). For example, in one aspect a system may include UE 402, serving cell base station 404, database 408, and loading indicator apparatus 450, or a different combination of these or other modules. Sub-module may also be implemented as modules communicatively coupled to other modules rather than included within parent modules. Additionally, it should be noted that one or more modules could be combined into a single module providing aggregate functionality. For example, analysis module 458 may include scheduling module 462, or vice versa, to facilitate analyzing respective UE transmit power data and generating respective UE UL schedules based on that data by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers ... ). Such components, inter alia, and in addition to that already described herein, can automate certain mechanisms or processes performed thereby to make portions of the systems and methods more adaptive as well as efficient and intelligent.

Figure 9:
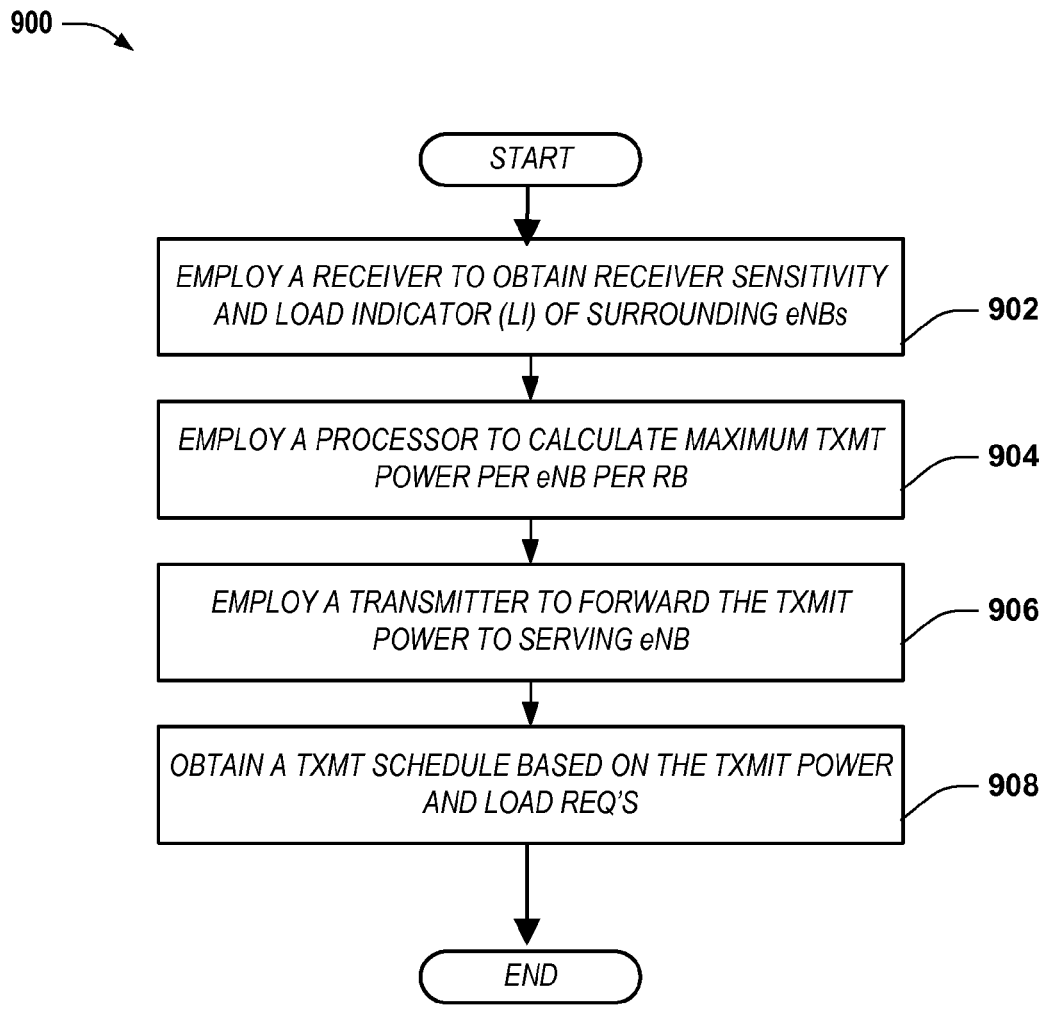
FIG. 9 illustrates details of a process for performing load indicator processing to facilitate inter-cell interference coordination.
Figure 10:
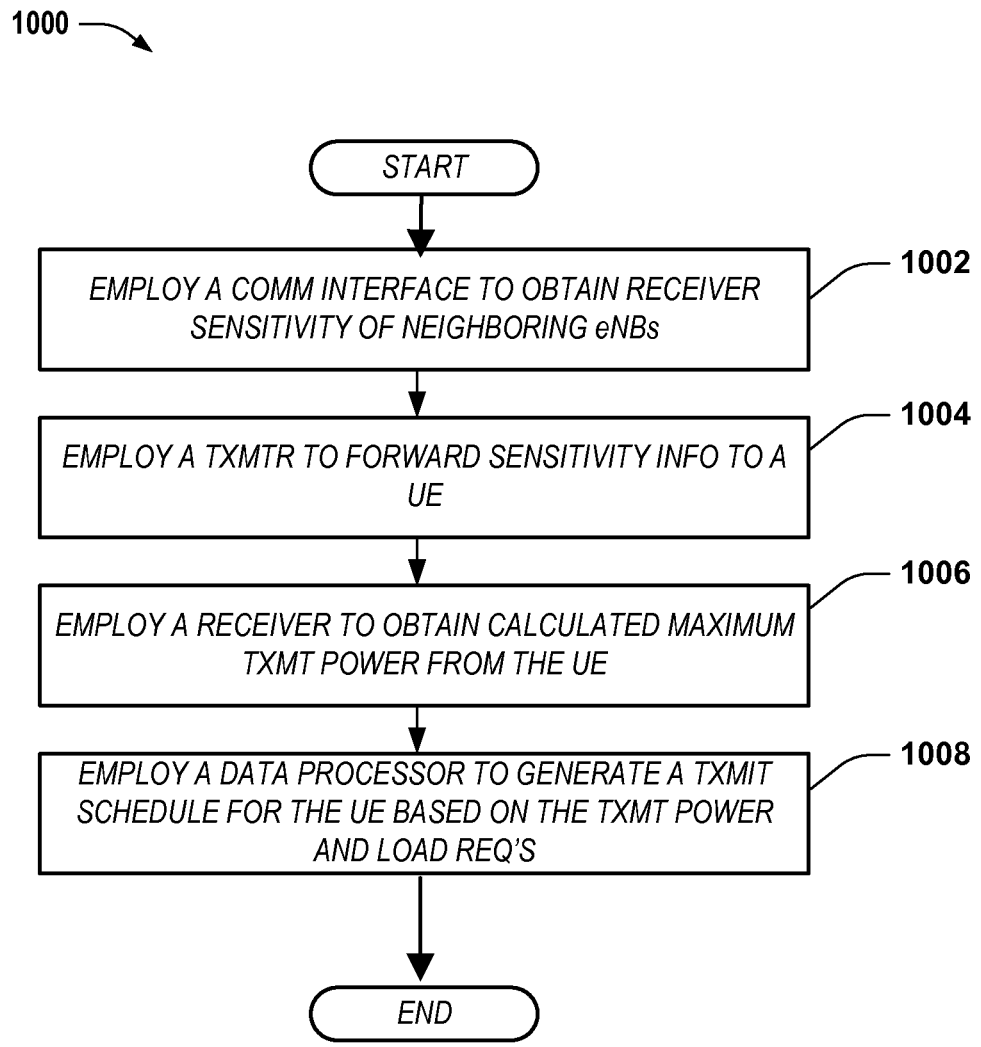
FIG. 10 illustrates details of an embodiment of a process for providing resource scheduling for use in facilitating inter-cell interference coordination.

In view of the exemplary systems described previously herein, methodologies that may be implemented in accordance with the disclosed subject matter will be better appreciated with reference to FIG. 9 and FIG. 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

FIG. 9 illustrates a flowchart of an embodiment of an example process 900 related to OTA-based loading and interference coordination according to various aspects. At stage 902, a wireless receiver may be employed to obtain receiver sensitivity information and/or load indicator information associated with a set of neighboring base stations, such as eNBs in adjacent or neighboring cells. The information may be obtained at a network node such as a UE. At stage 904, a data processor may be employed to calculate a transmit power metric, such as a maximum transmit power per resource block of the respective eNBs, such as described elsewhere herein. At stage 906, a wireless transmitter may be employed to forward the calculated transmit power, for example from a UE to a serving eNB. Further, at stage 908, a transmit schedule may be obtained, where the schedule may include uplink channel allocation(s) or assignments, which may be based at least in part on the transmit power metric and interference loading requirements of an inter-cell interference coordination mechanism, such as described previously herein.

FIG. 10 illustrates a flowchart of an embodiment of an example process 1000 for providing resource scheduling based on OTA power determinations and loading coordination according to one or more aspects. At stage 1002, a communication interface may be employed to obtain receiver sensitivity information pertaining to one or more neighboring eNBs. At stage 1004, a transmitter may be employed to forward the receiver sensitivity information with system data to at least one served network node, such as a UE. The system data may further include transmit power information associated with the neighboring eNB. In an alternate aspect, the transmit power of the neighboring eNB can be set equal to a transmit power of a serving eNB. At stage 1006, a wireless receiver may be employed to obtain a calculated transmit power metric from the UE, which may be based in part on the system data. Furthermore, at stage 1008, a data processor may be employed to generate a transmit schedule for the UE, which may be based on the transmit power and/or interference loading requirements and/or other parameters.

Figure 11:
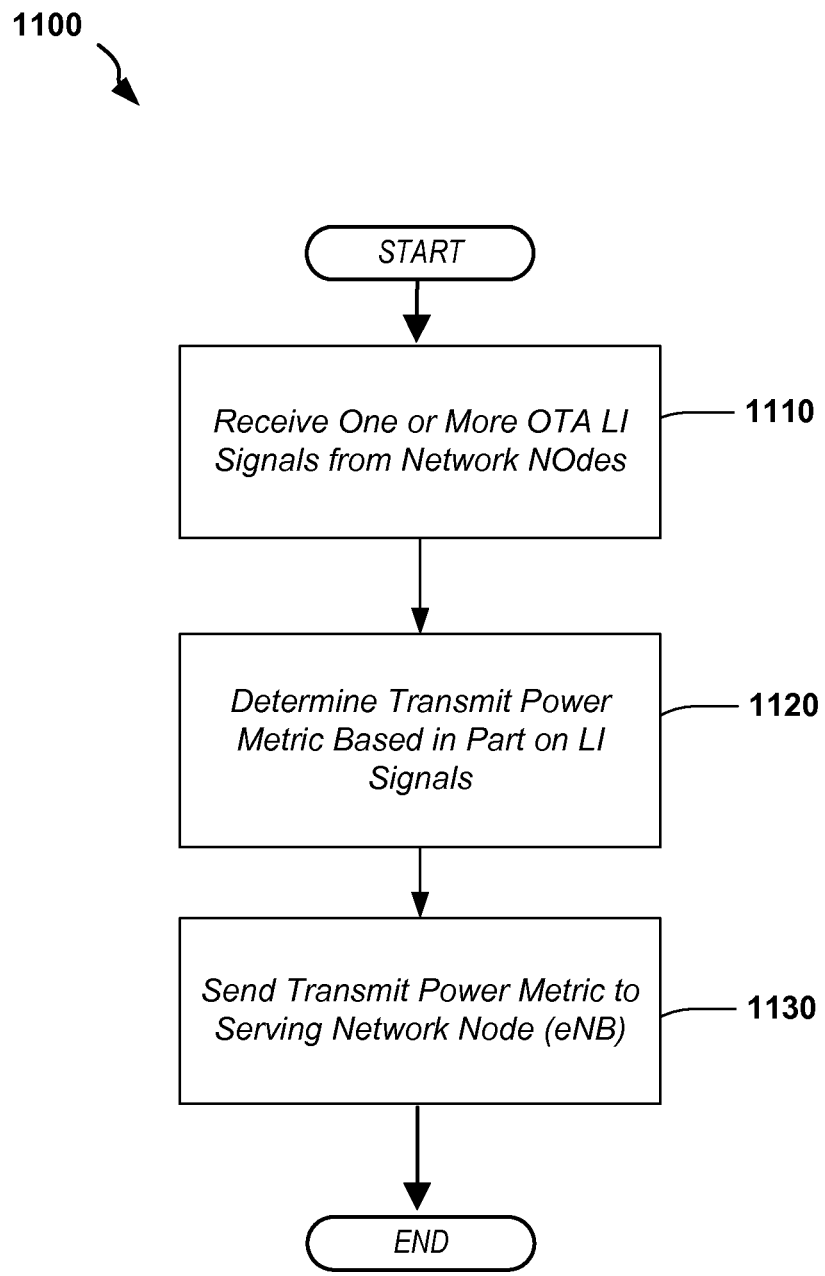
FIG. 11 illustrates details of an embodiment of a process for providing transmit power metrics for use in facilitating inter-cell interference coordination.

FIG. 11 illustrates a flowchart of an embodiment of an example process 1100 for providing transmit power metrics for inter-cell interference coordination according to various aspects. Process 1100 may begin at stage 1110 where one or more over the air (OTA) load indicator signals (LI) are received, which may be at a UE. The LI signals may be provided by one or a plurality of adjacent cells, such as from eNBs or other base stations in the adjacent cells. At stage 1120, a transmit power metric may be determined, such as described previously herein. The metric may be based on the LI signals, and/or may further be based on other parameters such as receiver sensitivity, path loss, or other data or information. The metric may be based on a minimum of a maximum transmit power level determined for each of the adjacent cells, or may be based on other functions of the adjacent cells, or may be a composite of information received from adjacent cells.

At stage 1130, the transmit power metric may be send to a serving network base station, such as an eNB associated with the cell. Upon receipt at the base station, the transmit power metric may be used to determine scheduling, such as for scheduling uplink transmission from the UE or other network nodes.

Figure 12:
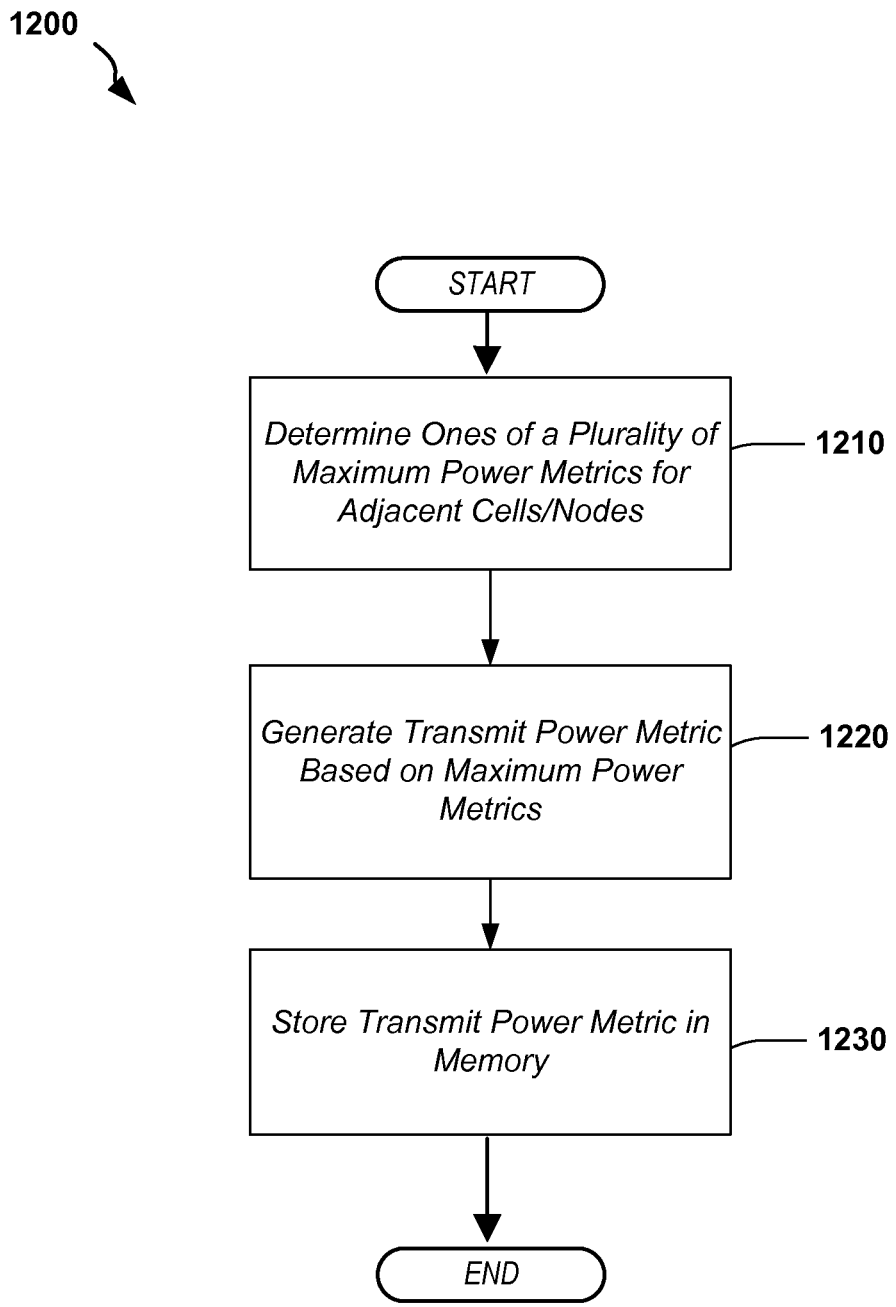
FIG. 12 illustrates details of an embodiment of a process for generating a transmit power metric for use in facilitating inter-cell interference coordination.

FIG. 12 illustrates a flowchart of an embodiment of an example process 1200 for generating a transmit power metric in accordance with various aspects. At stage 1210, ones of a plurality of maximum power metrics may be determined. This may be done at a UE based on OTA LI signaling received from a plurality of adjacent or neighboring cells. At stage 1220, a transmit power metric may be generated, such as described previously herein. The transmit power metric may be a function of the LI signals received from the adjacent or neighboring stations. The transmit power metric may be further based on a receiver sensitivity value and/or on a path loss value, and/or on other related or associated parameters, such as a UE offset metric. The generating may further include correction for accumulated OTA correction. At stage 1230, the transmit power metric may be stored in a memory, which may be a memory element of a UE, such as shown in FIG. 16. In addition, the transmit power metric may be sent to a serving base station, such as an associated eNB, for further use in providing functions such as UE uplink scheduling and allocation.

Figure 13:
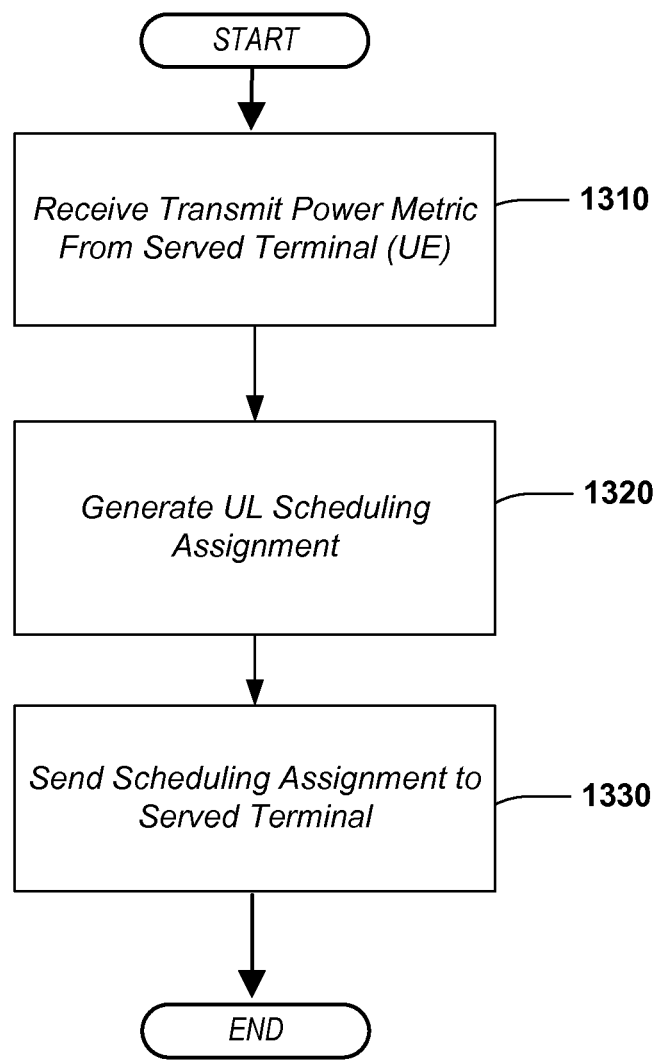
FIG. 13 illustrates details of an embodiment of a process for generating uplink scheduling for use in facilitating inter-cell interference coordination.

FIG. 13 illustrates a flowchart of an embodiment of an example process 1300 for generating uplink (UL) scheduling in accordance with various aspects. At stage 1310, a transmit power metric may be received, such as at a cell base station such as an eNB. The transmit power metric may be received from a served terminal, such as a UE. At stage 1320, a schedule may be generated. The schedule may be based in part on the transmit power metric. The schedule may be based on other data or information provided to the base station. At stage 1330, the scheduling information, which may include uplink channel assignments, power levels, or other uplink-related signaling data or information may be provided to the served UE. The UE may then provide uplink transmission in accordance with the schedule so as to facilitate inter-cell interference mitigation.

Figure 14:
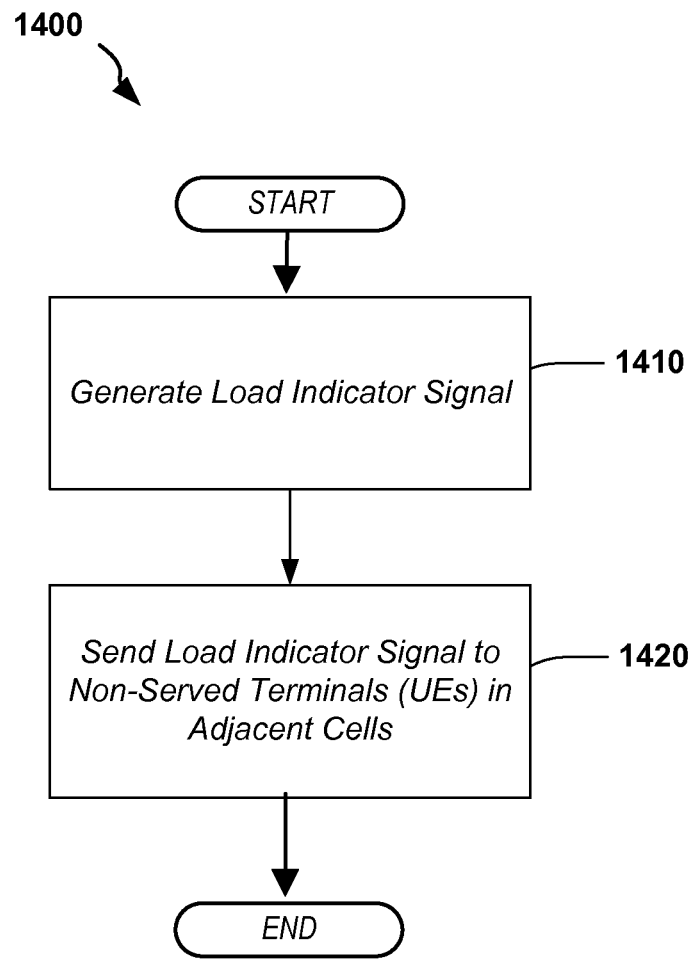
FIG. 14 illustrates details of an embodiment of a process for providing load indication signaling for use in facilitating inter-cell interference coordination.

FIG. 14 illustrates a flowchart of an embodiment of an example process 1400 for providing load indication signaling in accordance with various aspects. At stage 1410, a load indication signal (LI) may be generated. This may be done at a network node, such as base station or eNB, and may be further configured to provide OTA loading (or overloading) information to nodes in adjacent cells, such as UEs associated with adjacent or neighboring cells. At stage 1420, the LI signal may be transmitted. The transmission may be based on particular downlink channel configurations that may be shared or may be dedicated to OTA LI signaling. In addition, the base station may provide information to nodes in adjacent cells, such as adjacent eNBs. The information may relate to receiver sensitivity, path loss, or other data or information.

Figure 15:
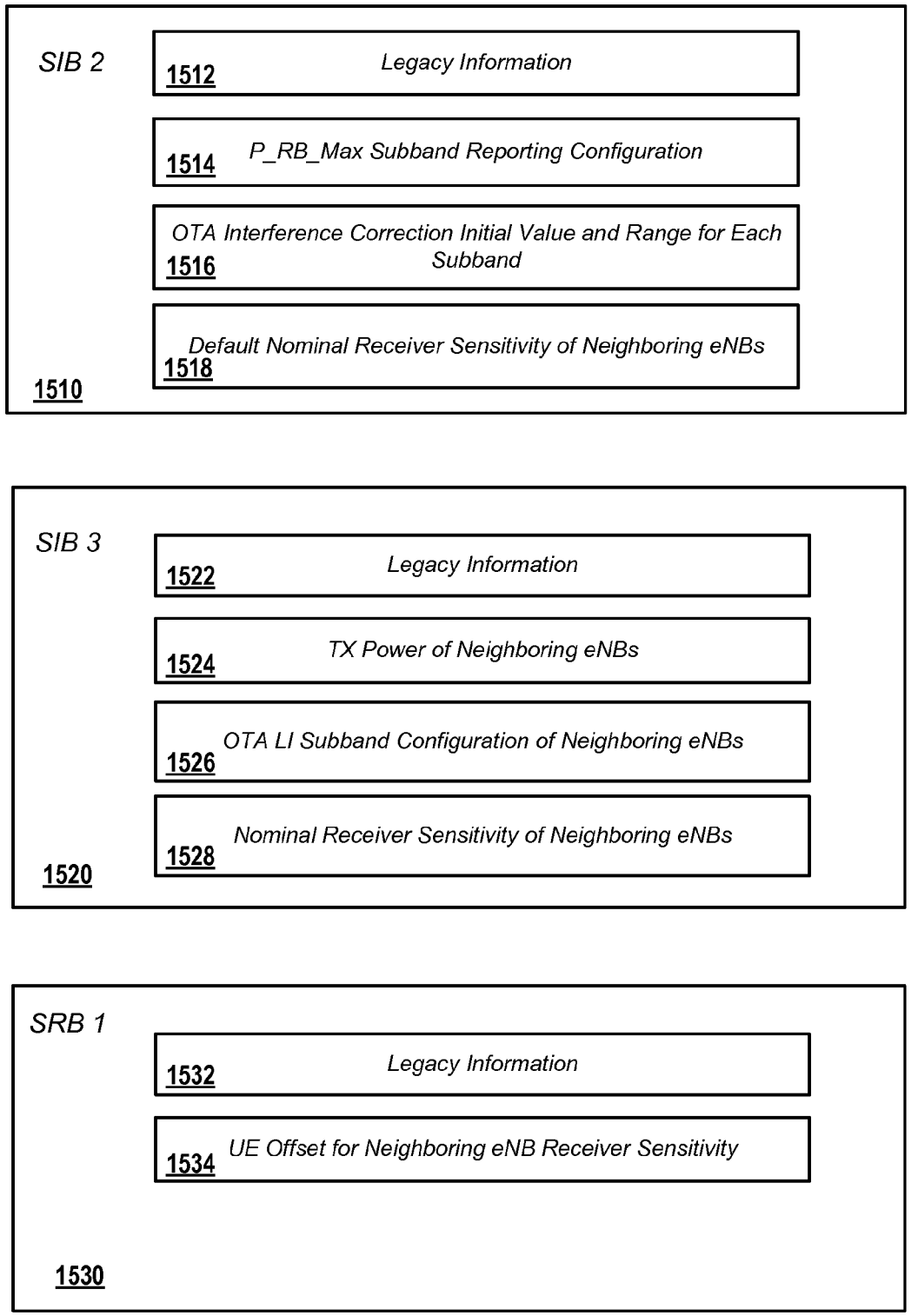
FIG. 15 illustrates example information elements (IE) for embodiments of system information broadcast (SIB) data.

FIG. 15 illustrates examples of system information provided to facilitate inter-cell interference coordination. System information block (SIB) 1510, denoted as SIB2, may be transmitted from a cell base station such as an eNB. SIB2 may include information elements (IEs) 1512, 1514, 1516, and 1518. IE(s) 1512 includes legacy SIB2 information. IE 1514 includes information such as a subband reporting configuration, which may be a $P_{RBmax}$ subband reporting configuration in accordance with transmit power metric determination described previously herein. IE 1516 may include an OTA interference correction value, and may further include a range for each configured subband. IE 1518 may include receiver sensitivity information, such as a default nominal receiver sensitivity for neighboring eNBs, which may be determined or provided as described previously herein.

SIB 1520 illustrates an example configuration of a SIB denoted as SIB3 including IEs 1522, 1524, 1526, and 1528. As with SIB 1510, SIB 1520 includes legacy SIB information (in this case SIB2 information as IE(s) 1522), along with IE 1524, which may include data related to transmit power of neighboring cells/eNBs. IE 1526 includes information associated with OTA LI subband configuration of neighboring cells/eNBs. IE 1528 include information associated with receiver sensitivity of neighboring cells/eNBs.

Block 1530 illustrates an example configuration of a signaling radio bearer (SRB), denoted as SRB1. SRB 1 may include legacy information 1532, and may further include data or information 1534 related to UE offsets for neighboring eNB receiver sensitivity.

In accordance with another aspect, LI-based signaling, such as described previously herein, may be used to facilitate inter-cell coordination to mitigate interference by performing resource partitioning. For example, on uplink connections (e.g., transmissions from a user terminal or UE to a base station or eNB), a UE may be allocated a particular amount of total transmit power (rather than power density), which may then be used across the entire system bandwidth, or may be used in a particular subband or subbands (resulting in higher power density within those subbands). Allocating subbands may be done between eNBs through resource partitioning, which may use LI signaling as described previously herein.

As one example, if a UE of a neighboring cell is adjacent to a base station of another cell, such as in a heterogeneous network configuration, the downlink may significantly impact the UE. An example of this is shown in communications system 1600 of FIG. 16. In this example system, base station or eNB 1610 may be serving user terminal or UE 1615, but may have another user terminal UE 1625 in proximity. eNB 1610 may correspond with eNB 404 of FIG. 4, and UE 1605 may correspond to UE 402.

UE 1625 may be served by a neighbor base station eNB 1620 (e.g., a neighbor relative to eNB 1610 and its corresponding cell) eNB 1620 may correspond to eNB 424 or eNB 434 of FIG. 4. Alternately, or in addition, UE 1615 may be in proximity to eNB 1620. eNB 1610 and/or eNB 1620 may be femtocell or picocell base stations in some heterogeneous network implementations. In other implementations, eNB 1610 and/or 1620 may be macro cell base stations or other base station types.

eNB 1610 and/or eNB 1620 may be subject to interference on the uplink from UEs 1625 and 1615, respectively. For example, eNB 1610 may receive uplink interference 1614, which may potentially be very strong and which may interfere with desired signal 1612 from UE 1620. Similarly, eNB 1620 may experience uplink interference 1624 from UE 1615, which may impact desired signal 1622 from UE 1625.

To compensate for this interference, eNB 1610 and eNB 1620 may coordinate uplink transmission allocations and/or scheduling so as to orthogonalize uplink signaling, such as by partitioning resources across subbands. For example, as shown in graph 1670, which illustrates an allocated UE transmission profile between eNBs 1610 and 1620 (from the perspective if eNB 1610), the aggregate bandwidth may be partitioned into subbands that may be allocated between the associated UEs, such as UEs 1615 and 1625, based on desired or targeted average interference levels in particular subbands.

For example, if subband 1 has a targeted interference level (which may be based on signaling from UE 1625 and/or other nodes (not shown), such as may be reflected in LI signaling) as shown, UE 1615 may not be able to communicate with eNB 1610 at a suitable Signal to Noise and Interference Level (SINR), since the total power available would result in a received signal below the received interference level.

However, if UE 1625 is restricted to subband 1 rather than subband 2, with UE 1615 allocated solely to subband 2, signaling from UE 1615 in subband 2 may be received at a suitable level at eNB 1610 relative to the target interference level, as shown in graph 1670. Similarly, graph 1680 illustrates an example of received signaling at eNB 1620, where desired signal 1622 from UE 1625 will be received in subband 1 above a targeted interference level for the subband.

Uplink scheduling to facilitate resource partitioning may be implemented at a base station such as eNB 1610 or 1620 using received LI information, such as described previously herein. Based on the received information (which may be subband specific, as described previously), a scheduling module of the eNB may assess potential uplink subbands, which may be based on the received LI information, and/or other information received by or provided to the eNB, such as scheduling information from neighboring eNBs. The eNB may then schedule and transmit UE uplink transmission allocations in a smaller subband or smaller number of resource blocks (RBs) than the available uplink bandwidth. In addition, in some implementations, frequency hopping may be combined with subband scheduling and allocation to mitigate high interference levels over a small number of RBs.

In order to facilitate coordination for subband scheduling, certain system information may be provided in a serving cell, such as, for example, at UEs of a serving cell such as UE 402 of FIG. 4. As described previously, the serving base station, such as eNB 404 of FIG. 4, may receive P_RB_max (as described previously herein) allocation information, which defines the associated subband configuration. In an exemplary implementation, 1 subband may be defined as being equal to the Physical Uplink Shared Channel (PUSCH) bandwidth.

A UE, such as UE 402 of FIG. 4, which may correspond with UEs 1615 and/or 1620 of FIG. 16, reports a determined P_RB_max value per subband, which may be based on the processing algorithms described previously. The reporting may use, for example, a Media Access Control (MAC) Protocol Data Unit (PDU) format that corresponds to the configured number of subbands.

Additional information in the serving cell may include, for example, an initial correction value and/or range for each subband. This may be generated based on a process such as described previously with respect to FIG. 7. A nominal receiver sensitivity value of neighboring base stations, such as P_Pusch_nom_int as described previously may also be used in the serving cell.

Additional information that may be available in either the serving cell or neighbor cell may include information related to transmit power of neighboring eNBs. A UE in the serving cell may use this information to compute a path loss towards neighboring eNBs (based on, for example, reciprocity). The value may be set to a default value corresponding to the serving cell if the information is not available.

Likewise, the OTA LI subband configuration of neighboring cell eNBs may be used if available. If not available, it may be set to a default value corresponding to the serving cell configuration. In addition, the nominal receiver sensitivity of neighboring cell eNBs (e.g., P_Pusch_nom_int) may be used by a serving cell UE to generate P_RB_max. If not available, it may similarly be set to a default value, such as a default value that may be signaled in a System Information Block (SIB) of the serving cell. In one implementation, the information may be in an Information Element (IE) of SIB2.

In some cases the UE may have difficulty decoding information on the target cell, such as SIBs. In this case, the UE may request measurement gaps (i.e., time/resource allocations where transmissions are omitted, for example from the serving cell). In some implementations, the UE may autonomously tune out neighboring cells without an explicit request to the corresponding eNB. In general, the serving cell UE will need to be aware of system information associated with the neighboring cells and will need to be notified if the system information changes.

Transmission of LI information and associated signal processing may be configured between multiple base stations or eNBs, such as in a heterogenous network, for resource partitioning. For example, configuration may include providing information related to proposed subbands, noise values such as IoT values, and/or other data or information. In some cases, configuration may be predefined or may be done as part of an OA&M function or during other configuration operations. However, in accordance with one aspect, configuration may be done dynamically, such as during addition or relocation of base stations in a heterogeneous network, based on loading, or other operational conditions or events.

Figure 17:
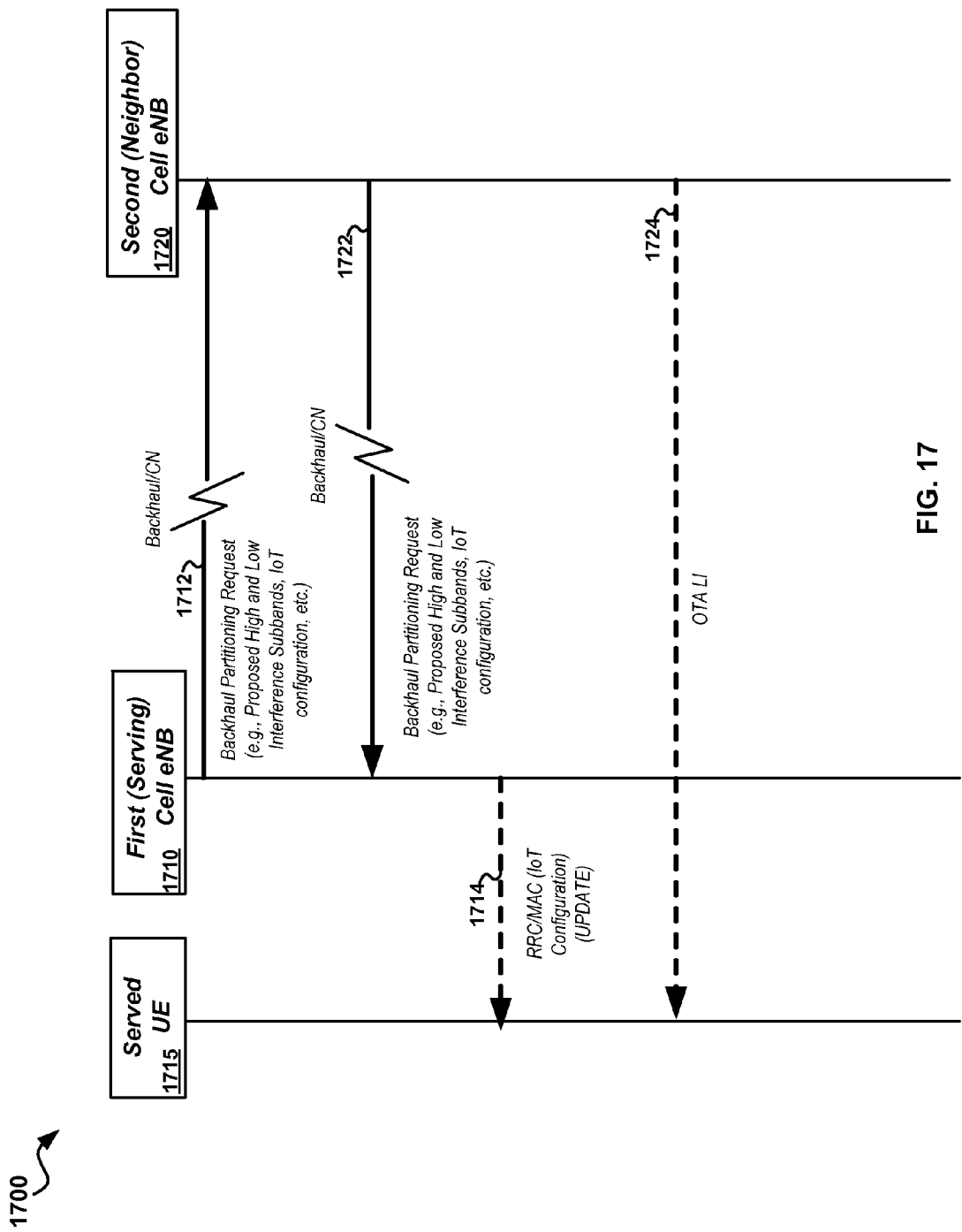
FIG. 17 illustrates a timing diagram for backhaul coordination between base stations to facilitate inter-cell interference coordination.

If a backhaul connection is available between base stations, signaling of LI configuration information for use in resource partitioning may be done using the backhaul connection, such as via an S1 connection or X2 connection. FIG. 17 illustrates an example timing diagram 1700 of signaling to configure two eNBs, which may correspond with those of FIG. 16. UE 1715 may correspond with UE 1615, and eNBs 1710 and 1720 may correspond with eNBs 1610 and 1620, respectively.

In this example, eNB 1710 may have been initialized or relocated in the proximity of eNB 1720. For example, eNB 1710 may monitor signaling either directly or via communication from UE 1715 or other network nodes, and may generate a backhaul Partitioning Request message 1733 for transmission to neighbor cell eNB 1720. Message 1733 may include information related to proposed configuration parameters, such as, for example, proposed high and low subbands, IoT configuration, and/or other information.

The Partitioning Request message 1712 may be sent via a backhaul connection, such as an S1 or X2 connection. Upon receipt of Message 1712, eNB 1720 may review the message and perform one of several possible functions. For example, eNB 1720 may generate a Resource Partition Reject message (not shown), rejecting the resource partitioning proposed by eNB 1710 and/or any associated signaling.

Alternately, or in addition, eNB 1720 may propose an alternate configuration (not shown) or one or more alternate parameters. If the configuration request is acceptable, eNB 1720 may send a Resource Partitioning Response Message 1722, which may include acceptance of proposed configuration parameters, etc., and/or alternate proposals. The back and fourth signaling process may include sending additional requests and replies to further negotiate the configuration.

Once the base stations are configured, serving eNB 1710 may send a RRC/MAC Configuration Message 1714, which may include information associated with the negotiated configuration, such as the IoT configuration, and/or subband configuration or other information to configure LI processing. eNB 1720 may then send OTA LI transmissions 1724, such as described previously herein, that may be received and processed at serving UE 1715.

In some cases, no backhaul connection may be established between base stations. In this case, configuration may be standardized or incorporated in an OA&M function. In another implementation, the configuration information may be incorporated in an Information Element (IE) in a System Information Block (SIB) transmitted from the neighbor cell. For example, in system 1600 of FIG. 16, UE 1615 may receive and decode a SIB, such as SIB2 or SIB3, from base station 1620, with the SIB including the OTA LI configuration information. The UE may then extract the information and use it to process received LI information. In addition, UE 1625 may communicate the generated information, such as P_RB_max data, to eNB 1610, where it may be used as part of the orthogonalization partitioning processing.

On the downlink in a wireless communication system such as an LTE system, it may also be desirable to orthogonalize signaling by partitioning with respect to nodes such as eNBs of other cells. Loading indicators cannot be used for this purpose with respect to the downlink (since eNB schedule UEs on the uplink); however, other mechanisms for downlink resource coordination may be used in various embodiments.

An eNB will typically have a certain allocated transmit power density for downlink transmission, which may be fixed (e.g., power density across all subbands is fixed, but data may or may not be sent in particular subbands). This is different than a typical uplink scenario, where a UE may be allocated a particular amount of total transmit power (rather than power density), which is then allocated to the entire band or to a particular subband or subbands (resulting in higher power density within those subbands). However, within these constraints, orthogonalization may still be implemented and may provide potential performance advantages.

For example, in an implementation with two sets of users (e.g., two eNBs and their associated UEs), where each eNB is using the entire bandwidth for downlink transmission, transmissions from neighboring cells may interfere, resulting in a possible SINR of, for example, 0 dB. This may be particularly likely in a heterogenous network configuration where smaller base stations, such as femto or pico eNBs, are used.

If instead each user occupies half of the bandwidth, their dimensionality may be reduced; however, their SINR may improve, for example, to 20 dB (limited due to thermal noise rather than interference). Operation at a higher SINR may then allow more data throughput than in the interfering case, thereby increasing overall system performance.

As one example, if a UE of a neighboring cell is adjacent to a base station of another cell, such as in a heterogeneous network configuration, the downlink may significantly impact the UE. An example of this is shown in communications system 1800 of FIG. 18. In this example system, base station or eNB 1810 may be serving user terminal or UE 1815, but may have another user terminal UE 1825 in proximity. UE 1825 may be served by a neighbor base station eNB 1820 (relative to eNB 1810 and its corresponding cell). Alternately, or in addition, UE 1815 may be in proximity to eNB 1820. eNB 1810 and/or eNB 1820 may be femtocell or picocell base stations in some heterogeneous network implementations. In other implementations, eNB 1810 and/or 1820 may be macro cell base stations or other base station types.

UE 1815 and/or UE 1825 may be subject to interference on the downlink from base stations 1820 and 1810, respectively. For example, UE 1825 may receive downlink interference 1814, which may potentially be very strong and which may interfere with desired signal 1822 from eNB 1820. Similarly, UE 1815 may experience interference 1824 from eNB 1820, which may impact downlink signal 1812 from eNB 1810.

To compensate, eNB 1810 and eNB 1820 may coordinate transmission so as to orthogonalize signaling, such as across subbands. For example, as shown in graph 1870 illustrating an eNB 1810 transmission profile, the transmit power level in subband 1 may be higher than in subband 2 so as to mitigate interference with UE 1825 with respect to data received in subband 2 from eNB 1820. Similarly, as shown in graph 1880 illustrating an eNB 1820 transmission profile, transmitted power in subband 1 may be lower than in subband 2 so as to mitigate interference to UE 1815.

Power may be adjusted between two or more subbands in various ways. For example, in some implementations, the subband transmit power level may be a total amount of power allocated to a particular subband. In other cases, power density per subband may be fixed, but resource element usage for data transmission may be limited.

Figure 18:
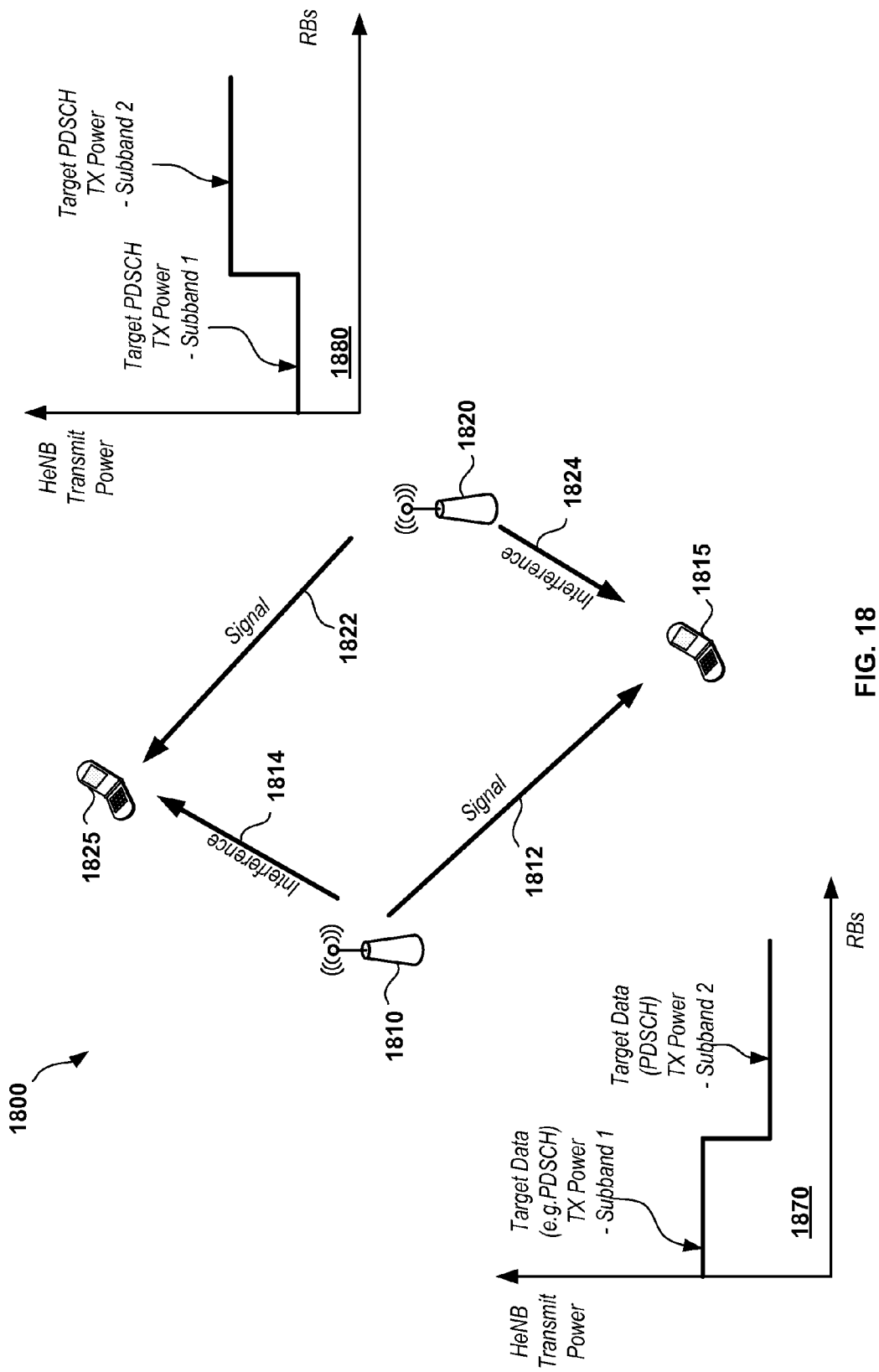
FIG. 18 illustrates details of an embodiment of a communication system on which downlink resource partitioning may be implemented.

Coordination between two or more base stations, such as eNB 1810 and eNB 1820 as shown in FIG. 18, may be done directly, such as via X2 communication or via 51 backhaul connections. Alternately, or in addition, coordination may be done indirectly, such as by using signaling provided by one or both base stations to UEs, such as served UEs or neighbor cell UEs.

While orthogonalized scheduling may be coordinated between base stations, it does not necessarily need to be directly coordinated. For example, random assignment of subbands between base stations may still allow for improved performance over full bandwidth operation if the eNBs can receive information about channel usage of adjacent cell base stations and then adjust its usage in response. In this way, eNBs may iterate to an optimal usage scenario, which may be continuously updated dynamically, without necessitating direct coordination.

In order to facilitate inter-base station coordination and frequency orthogonalization, in one implementation according to certain aspects, a base station or eNB may advertise its planned power information for future transmissions (e.g., per resource element(s), subbands, other time-frequency resources, etc.). This information may be denoted generally as Future Scheduling Information (FSI) and may be used by a receiving device to determine future planned resource usage, such as planned future subband usage, power per subband, power per antenna, phase per antenna, and/or other similar or related data or information. For example, in an exemplary embodiment, the FSI may use Relative Narrowband Transmit Power (RNTP) data and signaling. RNTP data and signaling may include, for example, power information. Alternately, or in addition, RNTP data may include related information such as, for example, power per antenna information, phase per antenna information, and/or other information. In some cases, transmission of FSI information may be coordinated between base stations, such as a serving base station and neighbor base station, however, it does not generally need to be coordinated across cells.

The FSI may be, for example, in a binary or on/off form indicating on which subbands there will be a future transmission (ON) and on which subbands there will be no transmission (OFF), along with associated timing information (e.g., when in the future the particular subbands will be on and off). Alternately, or in addition, the FSI may include additional information, such as a particular power level or power density level per subband, phase or phase offset information, such as phase offset per antenna, which may be determined relative to a reference such as a common reference signal or other signal, and/or additional power, timing, phase, and/or other information timing information, etc.

In an exemplary embodiment, the FSI information comprises RNTP information, including an RNTP bitmap. The bitmap may be based on a single bit per resource element or subband. In some cases, additional bits may be used to increase granularity. Alternately, or in addition, the FSI information may include phase offset per antenna information, power per subband, and/or other power, phase, timing, or related information.

The FSI will generate relate to downlink data transmission, such as in the Physical Downlink Shared Channel (PDSCH). However, in some implementations, it may also relate to other channels, such as downlink control channels, etc.

As noted previously, in general, the power density allocated to an eNB will be fixed. However, in some cases, power density may be variably configured across subbands. In this case, information on the variable power density may also be included in the FSI, however, this need not be done. For example, if Reference Signals (RSs), such as CRSs, are sent by an eNB at different power levels (e.g., corresponding to equivalent data transmission power levels in those subbands) a UE, such as UE 1815 or UE 1825 of FIG. 18 may receive these RSs from eNBs 1820 and 1810, respectively, and make a determination as to relative power levels in various subbands, which may be reported as part of the Channel State Information (CSI) to the serving eNB, such as eNBs 1810 and 1820, respectively. At the serving eNB, the variable power levels may then be taken into account in future scheduling. Although FIG. 18 illustrates a network configuration having only two base stations (eNB 1810 and eNB 1820), in various other implementations, additional base stations of the same or different types may also be deployed and may coordinate downlink transmissions to mitigate inter-cell interference.

Upon receiving FSI from one or more neighbor base stations, a user terminal, such as UE 1815 or UE 1825 of FIG. 18 may then use this information to report CSI or other information. In accordance with one aspect, the user terminal may generate Adjusted CSI information which incorporates or accounts for the received FSI, and reporting this information to a serving base station. In this way, the serving base station may determine downlink transmission based on the FSI information.

Figure 19:
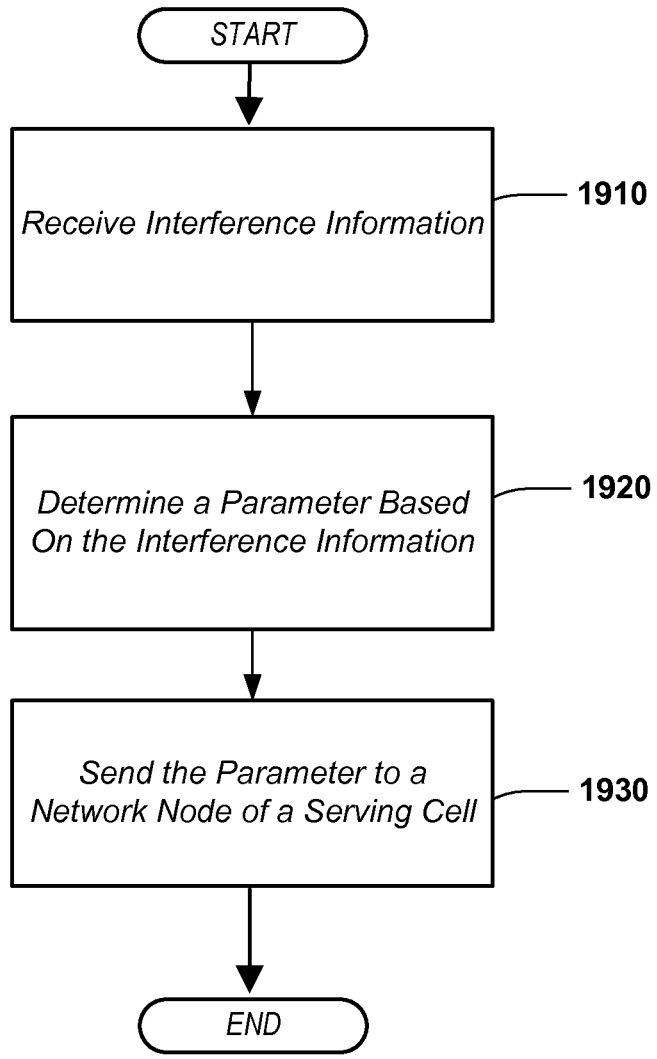
FIG. 19 illustrates details of an embodiment of a process for facilitating inter-cell interference coordination.

FIG. 19 illustrates details of an embodiment of process 1900 for providing information usable in interference coordination between cells, such as in communication system 1600 and/or 1800. At stage 1210, interference-related information may be received at a user terminal, such as UE 1615 or UE 1815. Based at least in part on the interference information, an interference adjustment parameter or metric may be determined or generated at stage 1920. For example, the parameter may relate to LI information received at the user terminal, to FSI information, such as OTA RNTP information, to combinations of this information, and/or to other received data or information associated with interference. The interference may be associated with a node of a neighboring cell, such as a base station such as eNB 1620 or 1820.

At stage 1930, the parameter may be sent to a network node, such as a base station serving the user terminal. The parameter may be used by the serving base station to coordinate resource partitioning and allocation, such as described previously herein.

The interference information may relate, for example, to signal transmission from at least one neighbor cell. The interference information may relate to uplink interference at the serving cell. The interference information may relate to one or more load indicator (LI) signals. The receiving may include, for example, receiving the one or more load indicator signals from a corresponding one or more network nodes operating in one or more neighbor cells.

The parameter may include, for example, a transmit power metric. The determining may include, for example, determining the transmit power metric based at least in part on the one or more load indicator signals.

The interference information may relate, for example, to downlink interference at a user terminal served by the serving cell. The interference information may relate to future scheduling information (FSI), which may include information regarding planned future downlink transmissions in one or more subbands. The FSI may include RNTP information which may be related to a planned downlink transmission in the neighbor cell.

The parameter may include, for example, adjusted channel state information (CSI). The adjusted CSI may include CQI information that may be adjusted based at least in part on the FSI. The adjusted channel state information may include one or more of CQI, PMI and RI.

Figure 20:
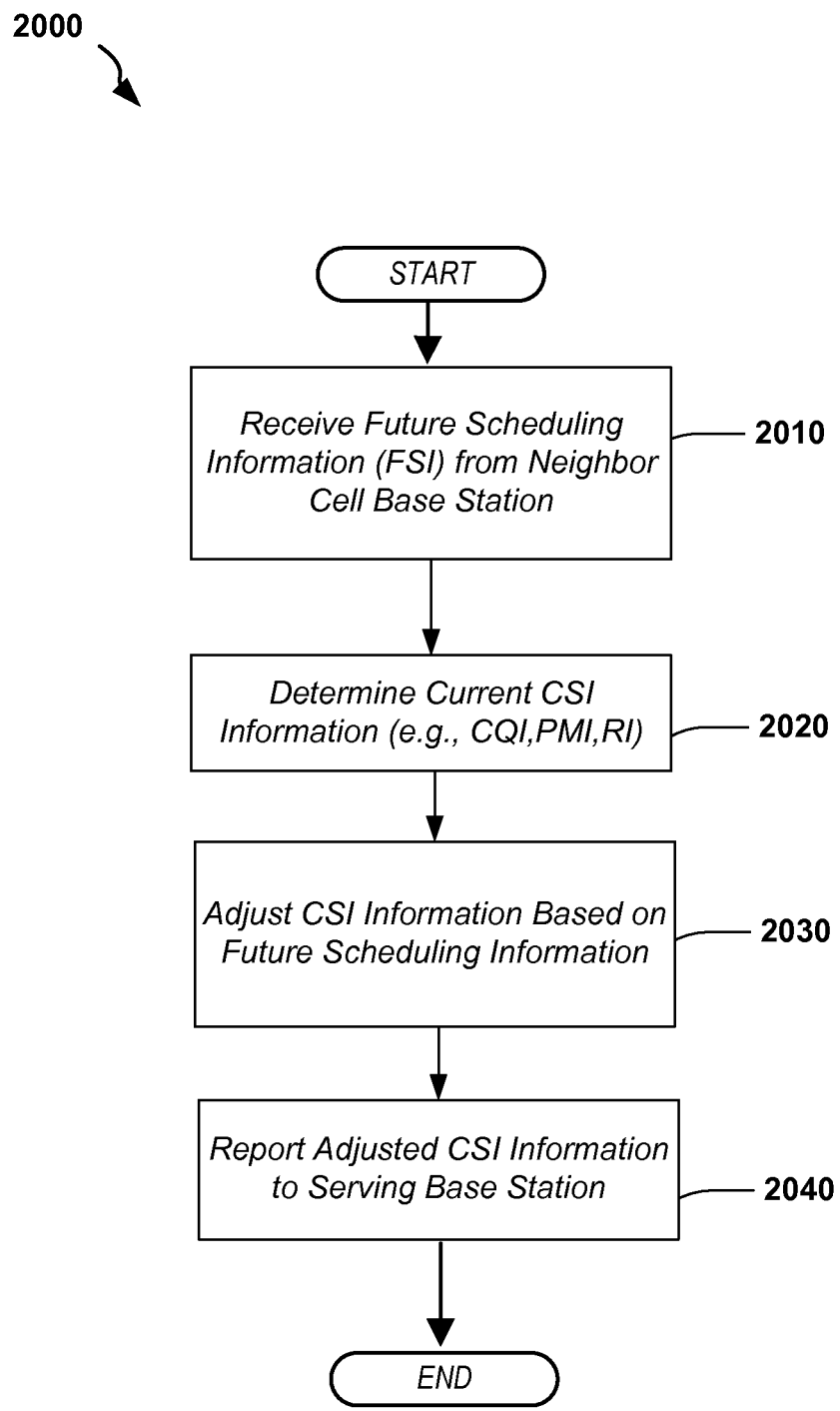
FIG. 20 illustrates details of an embodiment of a process for facilitating inter-cell interference coordination.

FIG. 20 illustrates an embodiment of a process 2000 that may be used to generate an adjusted Channel State Information (CSI) report (e.g., CQI/PMI/RI information) at a user terminal such as UE 1815. At stage 2010, Future Scheduling Information (FSI) may be received from another wireless network node, such as from a neighboring base station or eNB 1825. The UE may receive and decode the FSI, which may be formatted, for example, as RNTP information, such as an RNTP bitmap or other resource element or subband map or information, including data on subband usage and timing information. For example, the RNTP bitmap may include information on use of particular subband(s) (e.g., ON/OFF, or power density levels) as well as associated timing information as described previously.

At stage 2020, CSI information may be generated at the UE. This may include, for example, Channel Quality Indicator (CQI) information, Precoding Matrix Indicator (PMI) information, and/or Rank Indicator (RI) information.

At stage 2030, the CSI information may be adjusted, or scaled, based at least in part on the received FSI, so as to generate Adjusted CSI Information. The Adjusted CSI Information may include, for example, adjustments to data or information regarding predicted future channel characteristics, such as signal and interference levels. For example, Adjusted CQI data in the Adjusted CSI Information may indicate that a subband may support a higher MCS, thereby allowing a serving eNB to adjust future data transmission accordingly (e.g., by scheduling more data in the subband, etc.).

In general, adjusted CSI reporting timing may be configured to be relatively slow (e.g., on the order of multiple 10s or 100s of milliseconds) to avoid excessive CSI reporting from the UE. In some cases, faster reporting may be used (e.g., on the order of 1 mS), however this will require very frequent reporting, which may be undesirable for overhead reasons, power consumption, etc.

At stage 2040, the Adjusted CSI Information may then be sent to a serving base station, such as an eNB. The serving base station may then use the adjusted CSI information to determine future downlink scheduling, which may be adjusted based at least in part on the Future Scheduling Information (e.g., coordinated based on future scheduling information from the neighbor base station).

In some cases, transmission of FSI/RNTP may be omitted. For example, if Reference Signal (e.g., Common Reference Signal (CRS)) power is scaled across subbands, transmission of FSI may not be needed. In this case, the base station is not transmitting at a constant power density across the system bandwidth (e.g., certain subbands at a lower power, while some are at higher power). At the UE a determination may be made as to which subbands are being used by a neighbor cell and/or at what relative power level. This may then be incorporated into adjusted CSI report information provided by the UE. Alternately, the UE may merely report CSI information to the eNB in a normal fashion, and the eNB may then make a determination as to which subbands are being used by the neighbor cell and at what power level (or levels).

Figure 21:
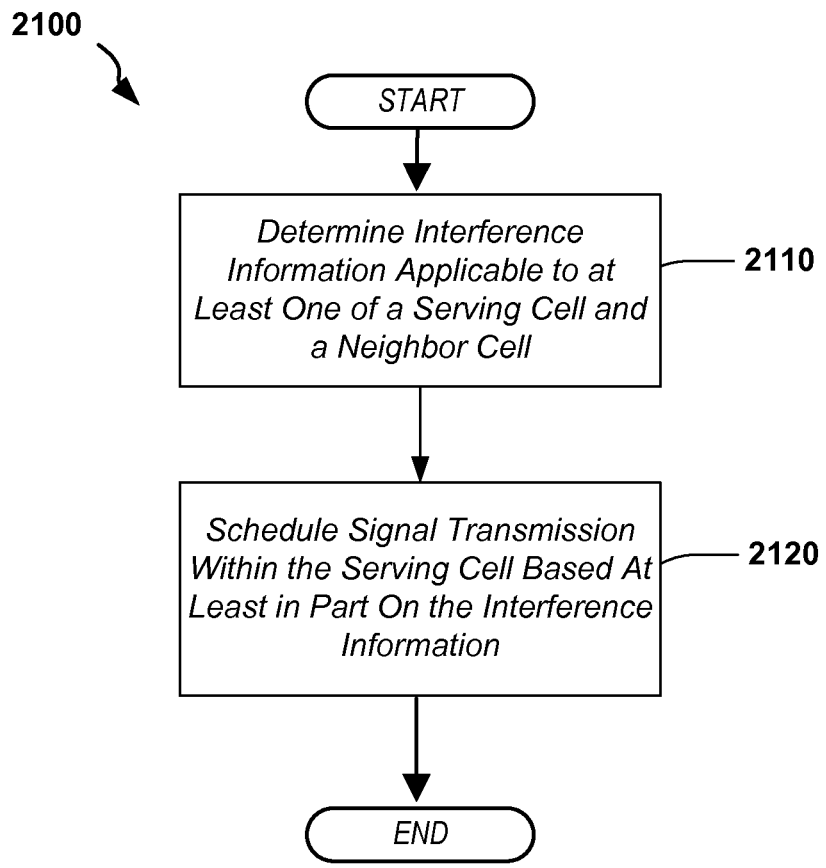
FIG. 21 illustrates details of an embodiment of a process for facilitating inter-cell interference coordination.

FIG. 21 illustrates details of an embodiment of a process 2100 for scheduling transmissions based on interference information, such as at a base station such as eNB 1610 or 1810 of FIGS. 16 and 18, respectively. The interference information may be determined at stage 2110 based on received information provided from a user terminal, such as, for example, UE 1615 or 1815. The received information may relate to, for example, LI information, FSI information, both LI and FSI information, and/or other data or information.

At stage 2120, one or more signal transmissions within a served cell may be scheduled based at least in part on the determined interference information. The signal transmissions may relate to uplink transmissions, for example from a served UE to a serving base station, and/or to downlink transmissions, such as from a serving base station to a served UE.

The interference information may include, for example, an interference value corresponding to an amount of uplink interference experienced at a serving base station in the serving cell. The process may further include comparing the interference value to a target value, and communicating, based upon the comparing, at least one load indicator (LI) signal to one or more devices in the neighboring cell. The at least one load indicator signal may be communicated to the neighboring cell using over the air (OTA) signaling.

The process may further include, for example, receiving a transmit power metric from a served UE. The scheduling may further include generating, based at least in part on the transmit power metric, an uplink scheduling assignment for the served UE. The process may further include communicating a resource partitioning request to one or more nodes in the neighboring cell. The process may further include receiving a resource partitioning response. The resource partitioning request may relate to uplink subband partitioning between the serving cell and the neighboring cell.

The scheduling may be based, for example, upon a partitioning of uplink communication resources between the serving cell and the neighbor cell. The partitioning may be predetermined and communicated to the serving cell and the neighbor cell. Alternately or in addition, the partitioning may be dynamically determined based on information provided from a served user terminal in the serving cell. Alternately, or in addition, the partitioning may be negotiated between the serving cell and the neighbor cell.

The interference information may relate, for example, to resources to be used in transmission of one or more downlink signals from the neighbor cell. The interference information may relate to an expected amount of downlink interference experienced at a user terminal served in the serving cell. The interference information may relate, for example, to relative narrowband transmit power (RNTP) information associated with future transmissions in one or more subbands of the neighbor cell. The RNTP information may be sent from the neighboring cell using Over The Air (OTA) signaling.

The process may further include, for example, receiving adjusted Channel State Information (CSI) from a served UE. The scheduling may include generating, based at least in part on the Adjusted CSI, a downlink schedule for the serving base station. The downlink schedule may be based on a subband resource partition between the serving cell and the neighbor cell.

The process may further include, for example, communicating a resource partitioning request to one or more nodes in the neighboring cell. The process may further include receiving a resource partitioning response. The resource partitioning request may relate to a proposed downlink subband partitioning between the serving cell and the neighboring cell.

The scheduling may be based, for example, in part upon a negotiated partitioning of downlink communication resources between the serving cell and the neighboring cell. The partitioning may be predetermined and communicated to the serving cell and the neighbor cell. Alternately or in addition, the partitioning is predetermined and communicated to the serving cell and the neighbor cell. Alternately or in addition, the partitioning may be dynamically determined based on information provided from a served user terminal in the serving cell. Alternately or in addition, the partitioning may be negotiated between the serving cell and the neighbor cell.

Figure 22:
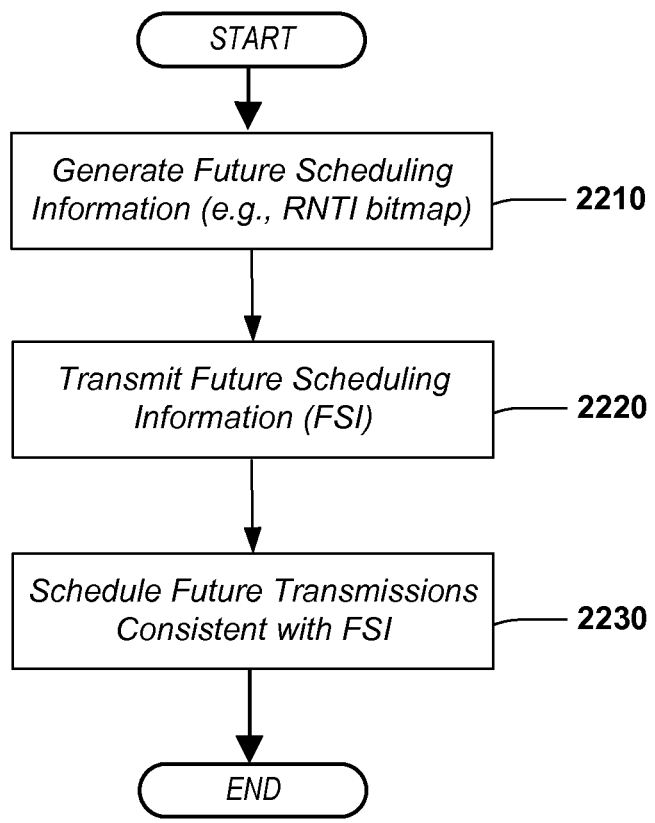
FIG. 22 illustrates details of an embodiment of a process for facilitating inter-cell interference coordination.

FIG. 22 illustrates details of an embodiment of a process 2200 for performing transmission of Future Scheduling Information (FSI), such as may be done by a base station, such as eNB 1810 or eNB 1820 of FIG. 18. At stage 2210, future scheduling information may be generated at the base station. This information may be, for example, generated based in part on interference coordination information received from another network node, such as a served UE such as UE 1815 and/or a neighboring cell base station, such as UE 1820, or from other network node. In some implementations, the FSI may be generated solely at the base station and not based on any particular interference coordination information received from another network node.

The FSI may be, for example, in the form of RNTP information, such as an RNTP bitmap defining intended future usage of particular subbands, such as an ON/OFF bitmap of planned future resource usage as described previously with respect to FIG. 20. For example, the bitmaps may indicate usage of subbands for the data transmission, such as on the Physical Downlink Shared Channel (PDSCH), in a predefined radio frame or number of radio frames. In one implementation the RNTP bitmap may use reserved Physical Broadcast Channel (PBCH) bits and/or reserved PDSCH Resource Blocks (RBs) in a predefined RB region. The predefined RB region may be a middle six RB region of the allocated RBs.

At stage 2220, the FSI information may be transmitted over the air (OTA), to one or more UEs in a cell served by the base station, and/or to UEs in one or more neighbor cells. If the UE is in a neighbor cell, it may incorporate the FSI information, such as into CSI information as described with respect to FIG. 20, and provide this information to a base station serving the neighboring cell UE (e.g., FSI information received from base station 1810 at UE 1825 may be reported to serving base station 1820). At stage 2230, future scheduled transmissions may be sent from the base station consistent with the FSI information.

The FSI may include, for example, RNTP information. The RNTP Information may be an RNTP bitmap. The control signaling may include one or more of PDCCH, PHICH, and PCFCH. The control signaling may be Physical Downlink Control Channel (PDCCH) signaling. The fixed offset may include a predetermined fixed power offset relative to the CRS. The fixed offset is predefined. Alternately or in addition, the fixed offset may be dynamically determined.

In some implementations, FSI, such as an RNTP bitmap, may be pseudo randomly generated in which case it need not be transmitted from a base station to a UE. For example, in one embodiment, a UE may generate a pseudo-random RNTP bitmap, which it may then use to adjust current CSI information (e.g., CQI, PMI, RI) to generated adjusted CSI information, which may then be transmitted and used by an associated serving eNB to generate orthogonalized data scheduling and corresponding downlink transmissions. The serving eNB may further generate and send FSI information associated with its own planned transmission, which may be received by UEs of neighboring cells and transmitted to their corresponding eNBs for use in coordinating scheduling. This approach may be combined with direct communication with neighboring cells to coordinate downlink scheduling, such as via X2 or S1 connections, and/or for use by neighboring cells and associated base stations to iteratively adjust downlink scheduling based on further FSI transmissions from one or both cells.

In some implementations, the base station or eNB may omit transmission of FSI information and utilize a Channel Quality Indicator Reference Signal (CQI-RS). In this approach, instead of transmitting a relative power ratio to the eNB so that a UE can use this information to compute proper CQI, the eNB may scale transmit power of a new Reference Signal, which may be denoted as a CQI Reference Signal (RQI-RS). In this case the UE may then use existing measurements to determine CQI information. To implement this, downlink signaling and associated reference signals may have fixed offsets. For example, Physical Downlink Shared Channel (PDSCH) Resource Elements (REs) and Channel State Information Reference Signals (CSI-RS, which are reference signals defined for LTE Advanced implementations for use in channel state information estimation) may have a fixed offset. referred to CQI-RS and then UE need not to do anything special, it simply utilizes existing measurements to compute CQI.

Transmission of FSI/RNTP information may be configured between multiple base stations or eNBs, such as in a heterogenous network. For example, configuration may include information related to the number of subbands being reported in the FSI, what the various values of the FSI relate to, for example, what RNTP values in an RNTP bitmap relate to (e.g., channel ON/OFF, values, etc.). Other parameters may also be configured, such as, for example, FSI periodicity, etc.

In some cases, configuration may be predefined or may be done as part of an OA&M function or during other configuration operations. However, in accordance with one aspect, configuration may be done dynamically, such as during addition or relocation of base stations in a heterogeneous network, based on loading, or other operational conditions or events.

Figure 23:
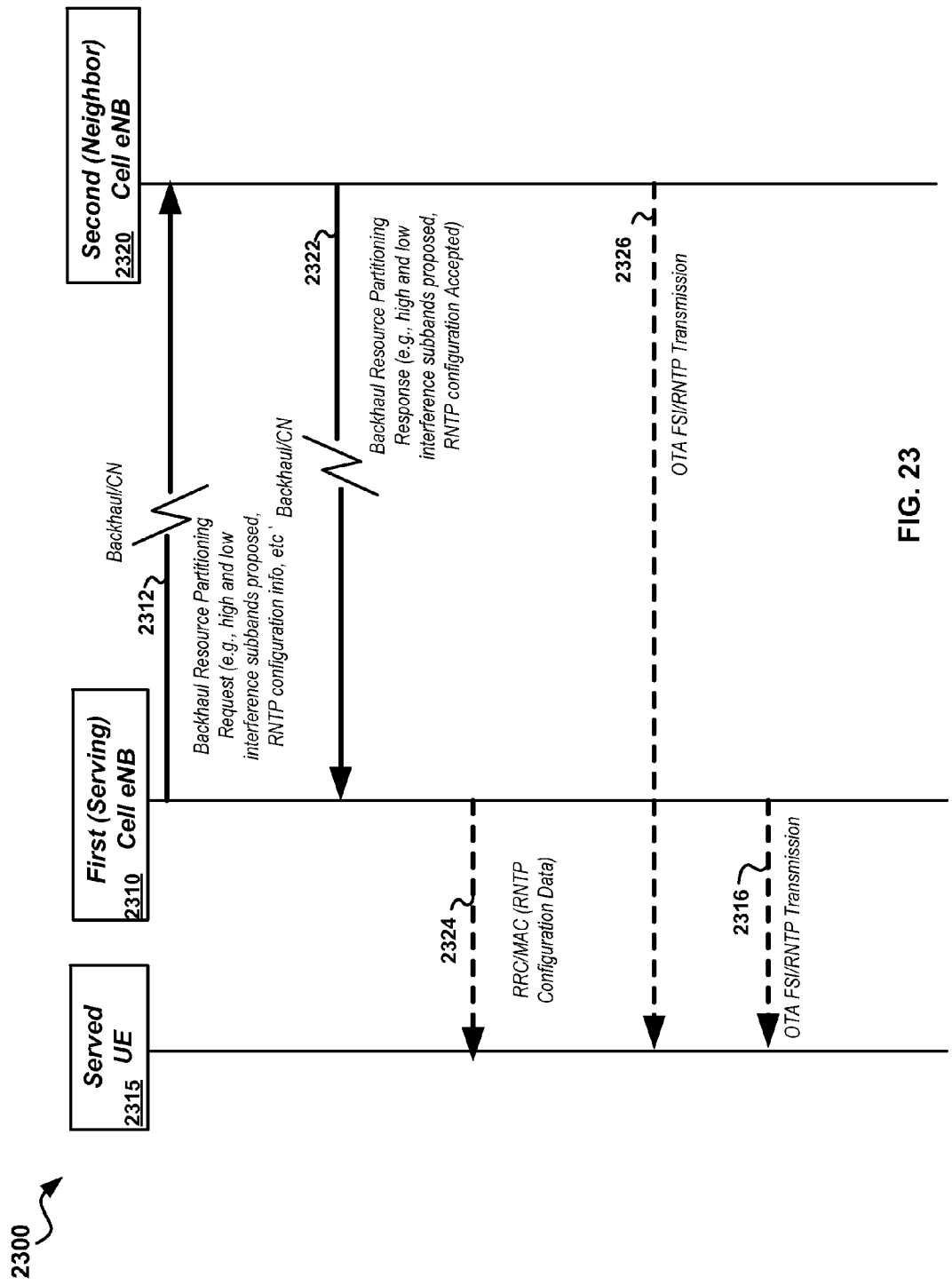
FIG. 23 illustrates a timing diagram for backhaul coordination between base stations to facilitate inter-cell interference coordination.

If a backhaul connection is available between base stations, signaling of FSI information may be done using the backhaul such as via an S1 connection or X2 connection. FIG. 23 illustrates an example timing diagram 2300 of signaling to configure two eNBs, which may correspond with system 1800, with UE 2315 corresponding with UE 1815, and eNBs 1810 and 1820 corresponding with eNBs 2310 and 2320, respectively. In this example, eNB 2310 may have been initialized or relocated in the proximity of eNB 2320. eNB 2310 may monitor signaling either directly or via communication from UE 2315 or other network nodes, and may generate a Partitioning Request message 2312 for transmission to neighbor cell eNB 2320. Message 2312 may include information related to proposed configuration parameters, such as, for example, proposed high and low subbands (such as are shown in FIG. 18), FSI/RNTI messaging configuration information, and/or other configuration information.

The Partitioning Request message 2312 may be sent via a backhaul connection, such as an S1 or X2 connection. Upon receipt of Message 2312, eNB 2320 may review the message and perform one of several possible functions. For example, eNB 2320 may generate a Resource Partition Reject message (not shown), rejecting the resource partitioning proposed by eNB 2310 and/or any associated signaling.

Alternately, or in addition, eNB 2320 may propose an alternate configuration (not shown) or one or more alternate parameters. If the configuration request is acceptable, eNB 2320 may send a Resource Partitioning Response Message 2322, which may include acceptance of proposed configuration parameters, etc., and/or alternate proposals. The back and fourth signaling process may include sending additional requests and replies to further negotiate the configuration.

Once the base stations are configured, the serving eNB 2310 may send a RRC/MAC Configuration Message 2324, which may include information associated with the negotiated configuration between eNB 2310 and eNB 2320 so as to allow UE 2315 to process received FSI/RNTP messages from eNBs 2310 and 2320. eNBs 2310 and 2320 may then send FSI/RNTP transmissions 2316 and 2326, respectively, consistent with the negotiated configuration. This process may be repeated subsequently, for example, based on further CSI information reported from UE 2315, etc.

In some cases, no backhaul connection may be established between base stations. In this case, configuration may be standardized or incorporated in an OA&M function. In another implementation, the configuration information may be incorporated in an Information Element (IE) in a System Information Block (SIB) transmitted from the neighbor cell. For example, in system 1800 of FIG. 18, UE 1825 may receive and decode a SIB, such as SIB2 or SIB3, from base station 1820, with the SIB including the FSI/RNTI configuration information. The UE may then extract the information and use it to process received FSI/RNTI information, such as described previously with respect to FIG. 20. In addition, UE 1825 may communicate the configuration information to eNB 1810, where it may be used as part of the orthogonalization processing.

Figure 24:
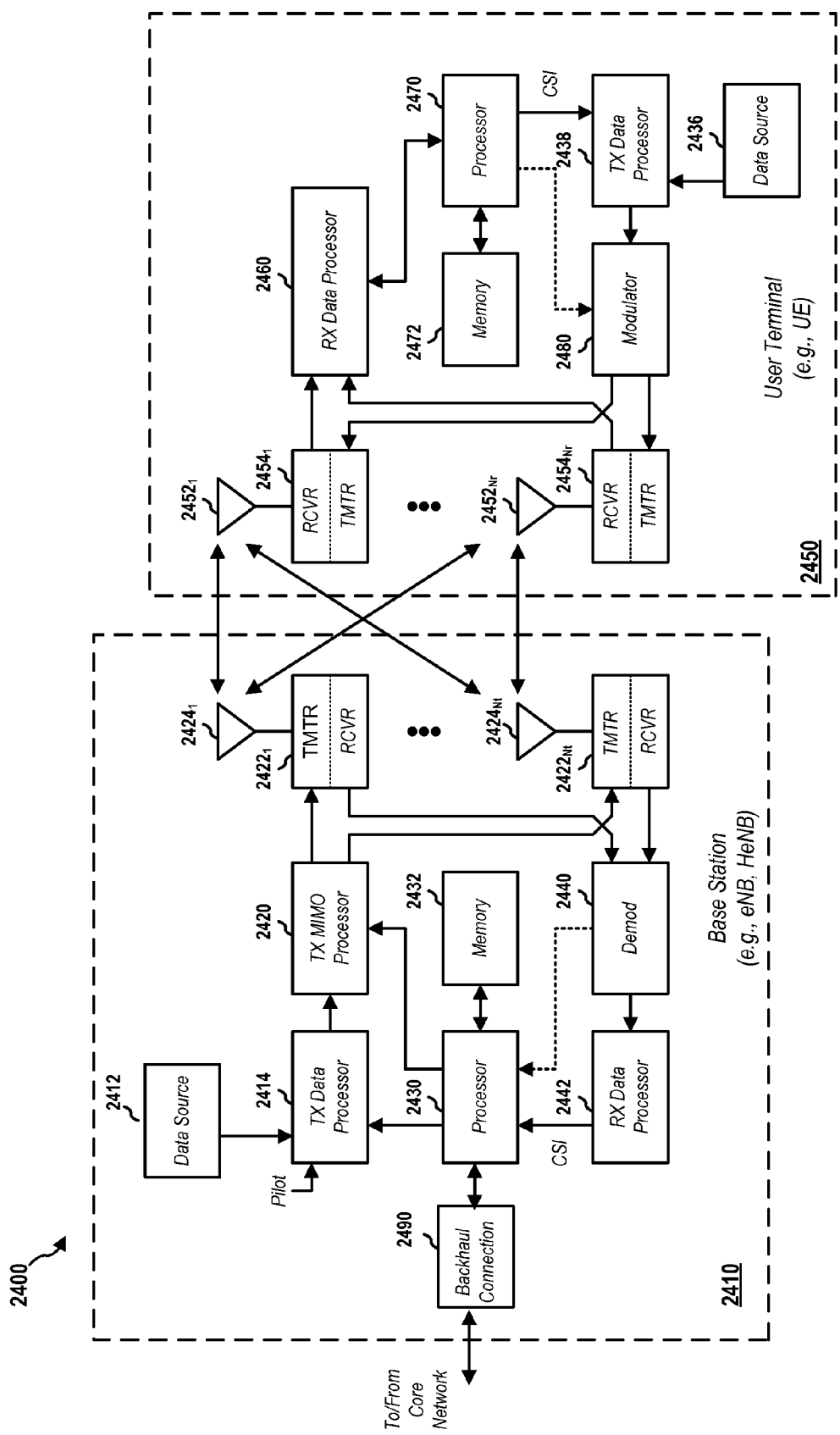
FIG. 24 illustrates details of embodiments of a base station and user terminal on which embodiments of aspects may be implemented.

FIG. 24 illustrates a block diagram of an embodiment of a base station 2410 (i.e., an eNB or HeNB) and a terminal 2450 (i.e., a user terminal, AT or UE) in an example communication system 2400, which may be an LTE communications system.

These systems may correspond to those shown elsewhere herein, such as in FIGS. 1-4, 16, and 18, and may be configured to implement the processes illustrated previously herein in FIGS. 9-15, and 19-22.

Various functions may be performed in the processors and memories as shown in base station 2410 (and/or in other components not shown), such as receipt of transmit signal metrics and determination of UE uplink scheduling and resource partitioning, and/or base station downlink scheduling and resource partitioning, as well as various other functions as described previously herein.

UE 2450 may include one or more modules to receive signals from base station 2410 to determine channel characteristics, interference information, and/or or other data or information, such as receipt and processing of load indicator signals, FSI/RNTP signals, and/or other system data, and to generate corresponding transmit power metrics, interference data and information, such as adjusted CSI information, and/or other data or information, such as power and interference level information, and/or other information associated with base station 2410 or other base stations, such as base stations in adjacent or neighboring cells (not shown in FIG. 24).

In one embodiment, base station 2410 may generate scheduling information based on information received from UE 2450 and/or from backhaul signaling from another base station or a core network element (not shown in FIG. 24) as described previously herein. This may be done in one or more components (or other components not shown) of base station 2410, such as processors 2414, 2430 and memory 2432.

Base station 2410 may also include a transmit module including one or more components (or other components not shown) of eNB 2410, such as transmit modules 2424. Base station 2410 may include an interference cancellation module including one or more components (or other components not shown), such as processors 2430, 2442, demodulator module 2440, and memory 2432 to provide interference cancellation functionality, such as described previously herein. Base station 2410 may include a resource partition coordination module including one or more components (or other components not shown), such as processors 2430, 2414 and memory 2432 to perform partition and resource allocation functions as described previously herein and/or manage the transmitter module and/or direct user terminal transmission based on the resource partition information.

Base station 2410 may also include a control module for controlling receiver functionality. Base station 2410 may include a network connection module 2490 to provide networking with other systems, such as backhaul systems in the core network or other components as shown in FIGS. 3A and 3B.

Likewise, UE 2450 may include a receive module including one or more components of UE 2450 (or other components not shown), such as receivers 2454. UE 2450 may also include a signal information module including one or more components (or other components not shown) of UE 2450, such as processors 2460 and 2470, and memory 2472. In one embodiment, one or more signals received at UE 2450 are processed to estimate channel characteristics, power information, spatial information and/or other information regarding eNBs, such as base station 2410 and/or other base stations (not shown). Measurements may be performed during particular subframes that are noticed to UE 2450 by base station 2410. Memories 2432 and 2472 may be used to store computer code for execution on one or more processors, such as processors 2460, 2470 and 2438, to implement processes associated with channel measurement and information, interference level or information, power level and/or spatial information determination, cell ID determination and selection, inter-cell coordination, interference cancellation control, as well as other functions related to resource allocation, partitioning, interlacing, and associated transmission and reception of signals in the presence of interference as are described herein.

In operation, at the base station 2410, traffic data for a number of data streams may be provided from a data source 2412 to a transmit (TX) data processor 2414, where it may be processed and transmitted to one or more UEs 2450. The transmitted data may be controlled as described previously herein so as to provide interlaced subframe transmissions and/or perform associated signal measurements at one or more UEs 2450.

In one aspect, each data stream is processed and transmitted over a respective transmitter sub-system (shown as transmitters $2424_1$-$2424_{Nt}$) of base station 2410. TX data processor 2414 receives, formats, codes, and interleaves the traffic data for each data stream based on a particular coding scheme selected for that data stream so as to provide coded data. In particular, base station 2410 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may include a reference signal. Pilot data may be provided to TX data processor 2414 as shown in FIG. 24 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 2430 based on instructions stored in memory 2432, or in other memory or instruction storage media of UE 2450 (not shown).

The modulation symbols for all data streams may then be provided to a TX MIMO processor 2420, which may further process the modulation symbols (e.g., for OFDM implementations). TX MIMO processor 2420 may then provide Nt modulation symbol streams to $N_t$ transmitters (TMTR) $2422_1$ through $2422_{Nt}$. The various symbols may be mapped to associated RBs for transmission.

TX MIMO processor 2430 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose($[b1\ b2\ \ldots\ b_{Nt}]$) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as $B1x1 + B2x2 + BN_s xN_s$, where $N_s$ beams are transmitted and xi is the modulation symbol sent using beam Bi. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system $2422_1$ through $2422_{Nt}$ receives and processes a respective symbol stream to provide one or more analog signals, and further conditions (e.g., amplifies, filters, and upconverts) the analog signals to provide a modulated signal suitable for transmission over the MIMO channel. $N_t$ modulated signals from transmitters $2422_1$ through $2422_{Nt}$ are then transmitted from $N_t$ antennas $2424_1$ through $2424_{Nt}$, respectively.

At UE 2450, the transmitted modulated signals are received by $N_r$ antennas $2452_1$ through $2452_{Nr}$ and the received signal from each antenna 2452 is provided to a respective receiver (RCVR) $2454_1$ through $2452_{Nr}$. Each receiver 2454 conditions (e.g., filters, amplifies and downconverts) a respective received signal, digitizes the conditioned signal to provide samples, and further processes the samples to provide a corresponding "received" symbol stream.

An RX data processor 2460 then receives and processes the $N_r$ received symbol streams from $N_r$ receivers $2454_1$ through $2452_{Nr}$ based on a particular receiver processing technique so as to provide $N_s$ "detected" symbol streams so at to provide estimates of the $N_s$ transmitted symbol streams. The RX data processor 2460 then demodulates, deinterleaves, and decodes each detected symbol stream to recover the traffic data for the data stream. The processing by RX data processor 2460 is typically complementary to that performed by TX MIMO processor 2420 and TX data processor 2414 in base station 2410.

A processor 2470 may periodically determine a precoding matrix for use as is described further below. Processor 2470 may then formulate an uplink message that may include a matrix index portion and a rank value portion. In various aspects, the uplink message may include various types of information regarding the communication link and/or the received data stream. The uplink message may then be processed by a TX data processor 2438, which may also receive traffic data for a number of data streams from a data source 2436 which may then be modulated by a modulator 2480, conditioned by transmitters $2454_1$ through $2454_{Nr}$, and transmitted back to base station 2410. Information transmitted back to base station 2410 may include power level and/or spatial information for providing beamforming to mitigate interference from base station 2410.

At base station 2410, the modulated signals from UE 2450 are received by antennas 2424, conditioned by receivers 2422, demodulated by a demodulator 2440, and processed by a RX data processor 2442 to extract the message transmitted by UE 2450. Processor 2430 then determines which precoding matrix to use for determining beamforming weights, and then processes the extracted message.

It is noted that in certain implementations apparatus and modules as described herein may be employed with a UE or other fixed or mobile device, and can be, for instance, implemented as a module such as an SD card, a network card, a wireless network card, a computer (including laptops, desktops, personal digital assistants PDAs), mobile phones, smart phones, or any other suitable device that can be utilized to access a network. The UE may access the network by way of an access component.

In one example, a connection between the UE and the access components may be wireless in nature, in which access components may be a serving eNB (or other base station) and the mobile device may be a wireless terminal. For instance, the terminal and base station may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, and the like. The access component can include one or more interfaces, e.g., communication modules, for communicating with other network nodes. Additionally, the access component can be a base station such as an eNB (or other wireless access point) in a cellular network, wherein base stations (or wireless access points) are utilized to provide wireless coverage areas to a plurality of subscribers.

In some configurations, the apparatus for wireless communication includes means for performing various functions as described herein. In one aspect, the aforementioned means may be a processor or processors and associated memory in which embodiments reside, such as are shown in FIGS. 16-18, and which are configured to perform the functions recited by the aforementioned means. The may be, for example, modules or apparatus residing in UEs, eNBs or other network nodes such as are shown herein and configured to perform the inter-cell interference related functions described herein. In another aspect, the aforementioned means may be a module or any apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

The invention claimed is:

1. A method for interference mitigation in a wireless communication system, the method comprising:
    determining interference information applicable to at least one of a serving cell and a neighbor cell, the interference information relating to at least one of an interference value corresponding to an amount of uplink interference experienced at a serving base station in the serving cell, or resources to be used in transmitting one or more downlink signals from the neighbor cell;
    scheduling signal transmission within the serving cell based at least in part upon the interference information; and
    communicating a resource partitioning request to one or more nodes in the neighboring cell.

2. The method of claim 1, further comprising:
    comparing the interference value to a target value; and
    communicating, based upon the comparing, at least one load indicator (LI) signal to one or more devices in the neighboring cell.

3. The method of claim 2, wherein the at least one load indicator signal is communicated to the neighboring cell using over the air (OTA) signaling.

4. The method of claim 1, further comprising receiving a transmit power metric from a served UE, wherein the scheduling includes generating, based at least in part on the transmit power metric, an uplink scheduling assignment for the served UE.

5. The method of claim 1, further comprising receiving a resource partitioning response.

6. The method of claim 1, wherein the resource partitioning request relates to uplink subband partitioning between the serving cell and the neighboring cell.

7. The method of claim 1, wherein the scheduling is based in part upon a partitioning of uplink communication resources between the serving cell and the neighbor cell.

8. The method of claim 7, wherein the partitioning is predetermined and communicated to the serving cell and the neighbor cell.

9. The method of claim 7, wherein the partitioning is dynamically determined based on information provided from a served user terminal in the serving cell.

10. The method of claim 7, wherein the partitioning is negotiated between the serving cell and the neighbor cell.

11. The method of claim 1, wherein the interference information relates to an expected amount of downlink interference experienced at a user terminal served in the serving cell.

12. The method of claim 1, wherein the interference information relates to relative narrowband transmit power (RNTP) information associated with future transmissions in one or more subbands of the neighbor cell.

13. The method of claim 1, wherein the RNTP information is sent from the neighboring cell using Over The Air (OTA) signaling.

14. The method of claim 1, further comprising receiving adjusted Channel State Information (CSI) from a served UE, wherein the scheduling includes generating, based at least in part on the Adjusted CSI, a downlink schedule for the serving base station.

15. The method of claim 14, wherein the downlink schedule is based on a subband resource partition between the serving cell and the neighbor cell.

16. The method of claim 15, wherein the scheduling is based in part upon a negotiated partitioning of downlink communication resources between the serving cell and the neighboring cell.

17. The method of claim 15, wherein the partitioning is predetermined and communicated to the serving cell and the neighbor cell.

18. The method of claim 15, wherein the partitioning is dynamically determined based on information provided from a served user terminal in the serving cell.

19. The method of claim 15, wherein the partitioning is negotiated between the serving cell and the neighbor cell.

20. The method of claim 1, further comprising communicating a resource partitioning request to one or more nodes in the neighboring cell.

21. The method of claim 20, further comprising receiving a resource partitioning response.

22. The method of claim 20, wherein the resource partitioning request relates to a proposed downlink subband partitioning between the serving cell and the neighboring cell.

23. The method of claim 1, wherein the interference information relates to power per antenna information associated with future transmissions in one or more subbands of the neighbor cell.

24. The method of claim 1, wherein the interference information relates to phase offset per antenna information associated with future transmissions in one or more subbands of the neighbor cell.

25. A computer program product embodied in a non-transitory computer-readable medium including codes for causing a computer to:
determine interference information applicable to at least one of a serving cell and a neighbor cell, the interference information relating to at least one of an interference value corresponding to an amount of uplink interference experienced at a serving base station in the serving cell, or resources to be used in transmitting one or more downlink signals from the neighbor cell;
schedule signal transmission within the serving cell based at least in part upon the interference information; and
communicate a resource partitioning request to one or more nodes in the neighboring cell.

26. A communications device, comprising:
a memory; and
a processor coupled to said memory, and configured to:
determine interference information applicable to at least one of a serving cell and a neighbor cell, the interference information relating to at least one of an interference value corresponding to an amount of uplink interference experienced at a serving base station in the serving cell, or resources to be used in transmitting one or more downlink signals from the neighbor cell;
schedule signal transmission within the serving cell based at least in part upon the interference information; and
communicate a resource partitioning request to one or more nodes in the neighboring cell.

27. The apparatus of claim 26, wherein the processor module is further configured to:
compare the interference value to a target value; and
communicate, based upon the comparison of the interference value to the target value, at least one load indicator (LI) signal to one or more devices in the neighboring cell.

28. The apparatus of claim 27, wherein the at least one load indicator signal is communicated to the neighboring cell using over the air (OTA) signaling.

29. The apparatus of claim 26, wherein the processor module is further configured to receive a transmit power metric from a served UE, and wherein the processor module configured to schedule signal transmission within the serving cell is further configured to generate, based at least in part on the transmit power metric, an uplink scheduling assignment for the served UE.

30. The apparatus of claim 26, wherein the processor module is further configured to communicate a resource partitioning request to one or more nodes in the neighboring cell.

31. The apparatus of claim 30, wherein the processor module is further configure to receive a resource partitioning response.

32. The apparatus of claim 30, wherein the resource partitioning request relates to uplink subband partitioning between the serving cell and the neighboring cell.

33. The apparatus of claim 26, wherein the processor module configured to the schedule signal transmission within the serving cell is based in part upon a partitioning of uplink communication resources between the serving cell and the neighbor cell.

34. The apparatus of claim 33, wherein the partitioning is predetermined and communicated to the serving cell and the neighbor cell.

35. The apparatus of claim 33, wherein the partitioning is dynamically determined based on information provided from a served user terminal in the serving cell.

36. The apparatus of claim 33, wherein the partitioning is negotiated between the serving cell and the neighbor cell.

37. The apparatus of claim 26, wherein the interference information relates to an expected amount of downlink interference experienced at a user terminal served in the serving cell.

38. The apparatus of claim 26, wherein the interference information relates to relative narrowband transmit power (RNTP) information associated with future transmissions in one or more subbands of the neighbor cell.

39. The apparatus of claim 26, wherein the RNTP information is sent from the neighboring cell using Over The Air (OTA) signaling.

40. The apparatus of claim 26, wherein the processor module is further configured to receive adjusted Channel State Information (CSI) from a served UE, and wherein the processor module configured to the schedule signal transmission within the serving cell is further configured to generate, based at least in part on the Adjusted CSI, a downlink schedule for the serving base station.

41. The apparatus of claim 40, wherein the downlink schedule is based on a subband resource partition between the serving cell and the neighbor cell.

42. The apparatus of claim 41, wherein the processor module configured to schedule signal transmission within the serving cell is based in part upon a negotiated partitioning of downlink communication resources between the serving cell and the neighboring cell.

43. The apparatus of claim 41, wherein the partitioning is predetermined and communicated to the serving cell and the neighbor cell.

44. The apparatus of claim 41, wherein the partitioning is dynamically determined based on information provided from a served user terminal in the serving cell.

45. The apparatus of claim 41, wherein the partitioning is negotiated between the serving cell and the neighbor cell.

46. The apparatus of claim 26, wherein the processor module is further configured to communicate a resource partitioning request to one or more nodes in the neighboring cell.

47. The apparatus of claim 46, wherein the processor module is further configured to receive a resource partitioning response.

48. The apparatus of claim 46, wherein the resource partitioning request relates to a proposed downlink subband partitioning between the serving cell and the neighboring cell.

49. The apparatus of claim 26, wherein the interference information relates to power per antenna information associated with future transmissions in one or more subbands of the neighbor cell.

50. The apparatus of claim 26, wherein the interference information relates to phase offset per antenna information associated with future transmissions in one or more subbands of the neighbor cell.

51. A communications device, comprising:
   means for determining interference information applicable to at least one of a serving cell and a neighbor cell, the interference information relating to at least one of an interference value corresponding to an amount of uplink interference experienced at a serving base station in the serving cell, or resources to be used in transmitting one or more downlink signals from the neighbor cell; and
   means for scheduling signal transmission within the serving cell based at least in part upon the interference information; and
   means for communicating a resource partitioning request to one or more nodes in the neighboring cell.

* * * * *